US006615383B1

(12) United States Patent
Talluri et al.

(10) Patent No.: US 6,615,383 B1
(45) Date of Patent: *Sep. 2, 2003

(54) SYSTEM AND METHOD FOR MESSAGE TRANSMISSION BETWEEN NETWORK NODES CONNECTED BY PARALLEL LINKS

(75) Inventors: Madhusudhan Talluri, Fremont, CA (US); Yousef A. Khalidi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/087,043

(22) Filed: May 29, 1998

(51) Int. Cl.[7] ................................................ G06F 11/14
(52) U.S. Cl. .................................................... 714/749
(58) Field of Search .................................. 714/748, 749

(56) References Cited

U.S. PATENT DOCUMENTS

| 4,977,499 A | * | 12/1990 | Banning et al. ............ 364/200 |
| 5,084,877 A | * | 1/1992 | Netravali et al. ............. 371/32 |
| 5,276,896 A | * | 1/1994 | Rimmer et al. ............. 395/800 |

(List continued on next page.)

FOREIGN PATENT DOCUMENTS

| GB | 2 250 897 A | 6/1992 |
| GB | 9912744.1 | 11/1999 |
| WO | WO99/35793 | 7/1999 |

OTHER PUBLICATIONS

"Microsoft® Windows NT™ Server Cluster Strategy: High Availability And scalability With Industry–Standard Hardware", © 1995 Microsoft Corporation, pp. 1–9.

Gouda et al., "A Periodic State Exchange Protocol and Its Verification", IEEE Trans. on Communications, vol. 43, No. 9, Sep. 1995, pp. 2475–2484.*

Primary Examiner—Stephen M. Baker
(74) Attorney, Agent, or Firm—Pennie & Edmonds LLP

(57) ABSTRACT

A first computer sends a sequence of messages to a second computer using remote write operations to directly store each message in a corresponding memory location in the second computer. The second computer retains information denoting the sequence numbers of the messages it receives and processes, and it acknowledges each received message with an asynchronous acknowledgment message. The first computer keeps track of which messages it has sent but for which it has not yet received an acknowledgment. Whenever the first computer determines that it has failed to receive a message acknowledgment from the second computer in a timely fashion, or it needs to reuse previously used message sequence numbers, the first computer undertakes remedial actions to resynchronize the first and second computers. The process begins by prompting the second computer to flush and process all the messages in its receive FIFO, and then comparing sequence number information recorded by the second computer with the sequence numbers of the outstanding, unacknowledged messages sent by the first computer. If the comparison indicates that any messages sent by the first computer were not received and processed by the second computer, those messages are re-transmitted. If necessary, during resynchronization the first computer will activate a different communication interface than the one previously used so as to establish a reliable connection to the second computer. After a success resynchronization, normal "send only" message operation resumes. At predefined times, the sequence number information retained by the second computer is cleared.

16 Claims, 14 Drawing Sheets

U.S. PATENT DOCUMENTS

| | | | |
|---|---|---|---|
| 5,319,648 A | * | 6/1994 | Bux et al. ..................... 371/32 |
| 5,410,536 A | * | 4/1995 | Shah et al. ................... 370/13 |
| 5,412,803 A | * | 5/1995 | Bartow et al. .............. 395/575 |
| 5,490,152 A | * | 2/1996 | Gregg et al. ................. 371/32 |
| 5,490,153 A | * | 2/1996 | Gregg et al. ................. 371/32 |
| 5,572,528 A | * | 11/1996 | Shuen .................... 370/85.13 |
| 5,613,068 A | * | 3/1997 | Gregg et al. ........... 395/200.13 |
| 5,727,002 A | | 3/1998 | Miller et al. .................. 371/32 |
| 5,751,719 A | * | 5/1998 | Chen et al. ................. 370/473 |
| 5,754,754 A | * | 5/1998 | Dudley et al. ......... 395/182.16 |
| 5,884,313 A | * | 3/1999 | Talluri et al. ................ 707/10 |
| 5,887,134 A | * | 3/1999 | Ebrahim ................... 395/200.3 |
| 5,897,664 A | | 4/1999 | Nesheim et al. ............ 711/206 |
| 5,944,797 A | * | 8/1999 | Gregg et al. ............... 709/237 |
| 5,948,060 A | * | 9/1999 | Gregg et al. ................ 709/212 |
| 5,948,108 A | * | 9/1999 | Lu et al. ........................ 714/4 |
| 5,961,606 A | * | 10/1999 | Talluri et al. ............... 709/234 |
| 6,014,710 A | * | 1/2000 | Talluri et al. ............... 709/237 |
| 6,026,448 A | | 2/2000 | Goldrian et al. ............ 709/712 |
| 6,032,193 A | * | 2/2000 | Sullivan .................... 709/239 |
| 6,049,808 A | * | 4/2000 | Talluri et al. ............... 707/201 |
| 6,049,892 A | * | 4/2000 | Casagrande et al. .......... 714/18 |
| 6,078,733 A | | 6/2000 | Osborne .................. 395/200.8 |
| 6,081,508 A | * | 6/2000 | West et al. ................. 370/238 |
| 6,098,180 A | * | 8/2000 | Kobata et al. ................ 714/18 |
| 6,175,933 B1 | | 1/2001 | Cadden ....................... 714/15 |
| 6,185,695 B1 | | 2/2001 | Murphy et al. ................. 714/4 |
| 6,295,585 B1 | | 9/2001 | Gillett , Jr. et al. ......... 714/148 |

* cited by examiner

SYSTEM AND METHOD FOR MESSAGE TRANSMISSION BETWEEN NETWORK NODES CONNECTED BY PARALLEL LINKS

The present invention relates generally to systems and methods for enabling a first computer to transmit messages and data to a second computer; and more particularly to a system and method for ensuring that each message is sent to the second computer once and only once while retaining a high level of message transmission reliability and using a "write only" message sending protocol to make such remote write operations efficient.

BACKGROUND OF THE INVENTION

In many multiple-processor computer systems it is important for processes or tasks running on one computer node (sometimes called the sender) to be able to transmit a message or data to another computer node (sometimes called the receiver), and to do so with absolute reliability. Also, it is extremely important that transmitted messages have a property called "idempotency," which means that each message must be processed by the receiver exactly once. The reason message processing must be idempotent is best explained by example. If the message to be processed is "move the elevator up one floor," and it is processed the wrong number of times, the elevator will go up the wrong number of floors, or a failure condition may be generated if the elevator is ordered to go past a topmost or bottommost floor. If the message to be processed is "transfer $1000 from account A to Account B," and it is processed the wrong number of times, accounts A and B will have the wrong amount of money.

Message transmission reliability can be improved using both hardware and software mechanisms. An example of a hardware mechanism for improving reliability is to provide two parallel communication links between network nodes (or between each network node and the network medium), instead of just one. An example of a software mechanism for improving reliability is to verify each remote message write operation by performing a synchronous remote read operation after the remote message write operation. Another software mechanism for improving message transmission reliability is for the receiving system to explicitly acknowledge receipt of every message sent to it. In this latter example, the sending system may process the message acknowledgments asynchronously, allowing other messages to be sent before the acknowledgment of a prior message is processed.

Generally, transmitting messages between computer nodes is expensive in terms of latency and resources used if the successful transmission of each message is verified by performing a remote read operation after each such remote message write operation.

Alternately, instead of using remote reads to verify the successful transmission of each message, in some prior art systems a message is written locally to a local buffer, and then a "cookie" (which is primarily a data structure pointing to the memory location or locations where the message is stored) or other notification message is sent to the receiving system. The receiving system then performs a remote read operation to read the message from the remote memory location indicated in the notification message. In another implementation of this same basic prior art technique, both the message and the cookie are stored locally in the sending system and only a trigger message is transmitted to the receiving system. The receiving system responds to the trigger message by performing a first remote read operation to read the cookie and a second remote read operation to read the message at the location indicated by the cookie.

An advantage of the prior art techniques using remote read operations as an integral part of every message transmission is that remote reads are synchronous, and thus the system performing the remote read is notified immediately if the message transmission fails.

Another advantage of using remote read operations to transmit messages is that remote read operations make it relatively easy to ensure that each message is received and processed by the receiving system once and only once (i.e., idempotent). In most networked computer systems it is essential not to send the receiving system the same message twice. As already mentioned above, sending the same message twice could cause the receiving system to perform an operation twice that should only be performed once. Each message must be reliably received and processed by the receiving system exactly once to ensure proper system operation.

Remote write operations are relatively "inexpensive," compared to remote read operations, in terms of system latency and system resources used, because the receiving CPU does not need to be involved in completing the write operation.

Referring to FIG. 1, there is shown a highly simplified representation of two prior art computer nodes herein called Node A 50, and Node B 52. The computer at each node can be any type of computer. In other words, the particular brand, architecture and operating system is of no importance to the present discussion, so long as each computer node is configured to operate in a networked environment. Each computer node 50, 52 will typically include a central processing unit (CPU) 54, random access memory 56, an internal memory bus 58 and one or more communications interfaces 60, often called network interface cards (NIC's). The computer nodes communicate with each other by transmitting messages or packets to each other via a network interconnect 62, which may include one or more types of communication media, switching mechanisms and the like.

Each computer node 50, 52 typically also has a non-volatile, random access memory device 64, such as a high speed magnetic disk, and a corresponding disk controller 66.

In this example, each computer node is shown as having two communications interfaces 60 for connecting that node to the network fabric. Providing two parallel communication links improves system reliability, since failure of a node's primary communication interface 60, or failure or disconnection of its cabling to the network interconnect, does not prevent the node from participating in network communications. In many systems, failure of a node's communication link is tantamount to failure of the entire node, because the node is essentially useless to the system without its network connection. Providing a redundant network connections (herein called parallel links) is a well known strategy for addressing this problem.

A well known problem associated with the use of parallel links, is that the link failover mechanism must either avoid resending messages that have already been received and processed by the receiving system(s), or it must provide some other mechanism for ensuring idempotency (e.g., providing a receiver side mechanism for recognizing and discarding duplicate messages). The idempotency problem is not created by or unique to systems using parallel links; rather, the problem is exacerbated because the use of parallel links introduces additional opportunities for inadvertent retransmission of messages. For example, a link may fail after a message has been successfully transmitted, but before the receiving system has had the opportunity to acknowledge receipt or processing of the message. Alternately, the receiving system may have transmitted a message acknowledgment, but the acknowledgment may be lost due to improper operation of a damaged link. The present invention solves the idempotency problem in a manner that addresses the link failure problem.

FIG. 2 shows a simplified representation of a conventional communications interface (or NIC) 60, such the ones used in the computer nodes of FIG. 1, showing only the components of particular interest. The NIC 60 typically includes two address mapping mechanisms: an incoming memory management unit (IMMU) 70 and an outgoing memory management unit (OMMU) 72. The purpose of the two memory management units are to map local physical addresses (PA's) in each computer node to global addresses (GA's) and back. Transport logic 74 in the NIC 60 handles the mechanics of transmitting and receiving message packets, including looking up and converting addresses using the IMMU 70 and OMMU 72.

The dashed lines between the memory bus 60 and the IMMU 70 and OMMU 72 represent CPU derived control signals for storing and deleting address translation entries in the two MMU's, typically under the control of a NIC driver program. The dashed line between the memory bus 60 and the transport logic 74 represents CPU derived control signals for configuring and controlling the transport logic 74.

Referring to FIGS. 3 and 4, the nodes in a distributed computer system (such as those shown in FIG. 1) utilize a shared global address space GA. Each node maps portions of its local address space into "windows" in the global address space. Furthermore, processes on each of the nodes map portions of their private virtual address space VA into the local physical address space PA, and can furthermore export a portion of the local physical address space PA into a window in the global address space GA. The process of "exporting" a portion of the local physical address space is also sometimes referred to as "exporting a portion of the local physical address to another node," because another computer node is given read and/or write access to the exported portion of the local physical address space via an assigned global address space range.

It should be noted that the local physical addresses (e.g., PA1 and PA2) shown in FIGS. 3 and 4 are physical bus addresses and are not necessarily memory location addresses. In fact, many physical addresses are actually mapped to devices other than memory, such as the network interface. For example, when physical memory on a first computer is exported to a second computer, the physical addresses used in the second computer to write to the exported memory are not mapped to any local memory; rather they are mapped to the second computers network interface.

When data is written by a process in Node A 50 to a virtual address corresponding to a location in Node B 52, a series of address translations (also called address mapping translations) are performed. The virtual address VA1 from the process in node A is first translated by the TLB (translation lookaside buffer) 80-A in node A's CPU 54-A into a local (physical) I/O address PA1. The local (physical) I/O address PA1 is then translated by the outgoing MMU (OMMU) 72-A in node A's network interface 60-A into a global address GAx. When the data with its global address is received by node B (usually in the form of a message packet), the global address GAx is converted by the incoming MMU (IMMU) 70-B in node B's network interface 60-B into a local physical address PA2 associated with node B. The local physical address PA2 corresponds to a virtual address VA2 associated with a receiving process. A TLB 80-B in node B's CPU 54-B maps the virtual address VA2 to the local address PA2 where the received data is stored.

It should be noted that the term "message transmission" is sometimes used to indicate or imply the use of a message transmission protocol in which the receiving system automatically processes the transmitted message, while the term "data transmission" simply indicates the writing or copying of data from one system to another. However, in this document, the terms message transmission and data transmission will be used interchangeably.

It should be noted here that TLBs generally only translate virtual addresses into local physical addresses, and not the other way around, and thus some of the arrows in FIG. 4 represent mappings rather than actual address translations. When the receiving process in the node B reads a received message at address VA2, the TLB 80-B will translate that virtual address into the same local address LA2 determined by the network interface's IMMU 70-B as the destination address for the received message.

Address space ranges for receiving messages are pre-negotiated between the sending and receiving nodes using higher level protocols that typically use reserved address space, mailbox, or packet based communications that are set up for this purpose. The details of how windows in the global address space are assigned and how receiver side addresses are set up for receiving messages are beyond the scope of this document. Furthermore, the present invention does not require any changes in such communication setup mechanisms.

Receive buffers are allocated in conveniently sized chunks using a corresponding MMU entry. Larger receive buffers, or receive buffers of irregular size, may be constructed using multiple MMU entries by user level protocols. Once the receive buffers are allocated and the corresponding MMU mappings are established, user level programs can read and write to the receive buffers without kernel intervention. Many different kinds of user-level message passing "API's" (application program interfaces) can be built on top of the basic receive buffer mechanism. This includes the send and receive Unix primitives, sockets, ORB (object resource broker) transport, remote procedure calls, and so on. The basic message passing mechanism is designed to be as "light weight" and efficient as possible, so as to take as few processor cycles as possible.

The present invention utilizes the local physical address to global address mapping mechanisms discussed above.

Conventional Remote Write Methodology

FIG. 5 shows the conventional procedure for a process on node A to write a message into a receive buffer at node B. The first step is for Node A to send a request to Node B to set up a receive buffer (also called exporting memory) so that Node A can write a message into it (step 100).

Node B then sets up one or more receive buffers and "exports" the memory allocated to the receive buffer(s) to node A (step 101). In some implementations, this step may be performed in advance, because it is known in advance that Node A will be sending many messages to Node B. In other implementations, the memory exporting step is performed by a procedure in Node B that, before sending a method invocation message or the like to Node A, sets up a receive buffer to receive the results of the method invocation. The memory exporting step 101 is performed by creating an IMMU entry in Node B that maps the physical address range of a receive buffer in Node B's memory to a corresponding range of global addresses and also by setting up a corresponding virtual address to physical address mapping. As indicated above, Node B will typically have a range of global addresses preassigned to it for exporting memory to other nodes. However, other mechanisms for assigning global addresses would be equally applicable.

Next, at step 102, a memory export message is transmitted by Node B to Node A that specifies:

the destination node to which the message is being transmitted;

the source node from which the message is being sent;

the global address corresponding to the receive buffer being exported to Node A; and other parameters, such as protocol parameters, not relevant here.

At Node A, when the memory export message is received, Node A's NIC driver sets up an OMMU entry to import the memory being exported by Node B and also sets up a corresponding virtual address to physical address mapping so that a process in Node A can write data into the receive buffer (step 104). The OMMU entry set up at step 104 maps the global address range specified in the received message to a corresponding range of physical memory in the server node. If necessary (e.g., if insufficient contiguous memory is available and/or the size of the mapped address range is not equal to $2^n$ pages), the server node will generate two or more OMMU entries so as to map the specified global address space to two or more local physical address ranges. The mapped local physical addresses in the first computer are not locations in that computer's memory, rather they are otherwise unused addresses that are mapped to the computer's network interface by the OMMU entry or entries.

Once the IMMU in node B and the OMMU in node A have been set up, node A can transmit a message to node B. The dashed line between steps 104 and 106 indicates that no particular assumptions are being made as to the timing relationship between steps 104 and 106 (i.e., one may closely follow the other, or they may be separated both in time and logistically).

Once node A is ready to send a message to node B, the message sending procedure in node A marshals the data to be sent to node B (step 106), which basically means that the data is formatted and stored in a send buffer in a predefined manner suitable for processing by an application procedure in node B.

Then a remote write is performed to copy the contents of the send buffer to the assigned global addresses (step 108). Writing data to a global address causes the sending node's communication interface to transmit the data being written to the node associated with those global addresses, as indicated in the sending node's OMMU entry (or entries) for those global addresses. This data transmission operation (step 108) may be performed under direct CPU control by "programmed I/O" instructions, or it may be performed by a communications interface (NIC) DMA operation (i.e., in which case the DMA logic in the communication interface handles the transfer of data from local physical memory to the communications network).

Some communication networks and interfaces utilize what is known as an RMO (relaxed memory order) memory model, and can reorder messages so as the optimize the use of available resources. Also, many communication systems do not guarantee delivery of all messages handed off to them. Thus, there is no assurance that, once a message is sent, that it will actually be transmitted to the specified destination node, nor that it will be written into the receive buffer corresponding to the global addresses specified in the message. As a result, prior art computer systems are often designed to verify the transmission of each message before allowing any succeeding tasks to be performed. Such verification is typically achieved by performing a remote read (see step 110) so as to read at least a portion of the contents of the receive buffer in Node B, to determine whether or not the message was in fact written into the receive buffer.

Remote read operations are very expensive in terms of system latency, and communication system usage, because the thread in the sending system performing the remote read must wait for a request to be sent to the other node and for the response to be sent back before the thread can resume further processing. The resulting delay includes transmission time to and from the receiving system, access time on the remote system for accessing and invoking the procedure (s) needed to process the read request. Thus, remote reads tend to seriously degrade the performance of both the system performing the remote read and the communication system.

Remote write operations, on the other hand, are relatively inexpensive because the thread in the sending system performing the remote write simply delivers to its communication interface the data to be remotely written, and then proceeds with the next instruction in its instruction stream.

As indicated, after performing the remote write in step 108, the typical message transmission procedure will perform a remote read to verify transmission of the message to the receive buffer in Node B. If the remote read operation determines that the message was not successfully stored in the receive buffer, the remote write step (108) is repeated.

In some systems, once the remote write step 108 successfully completes, another remote write operation (followed by a corresponding remote read operation) may be performed to store a short message in a "received message queue" in Node B. The short message typically contains a "cookie" or other data structure that indicates the location of the main message transmitted at step 108.

Finally, a trigger message is sent to Node B's network interface (step 116), which triggers the execution of a procedure in Node B for processing received messages (e.g., by inspecting the received message queue to determine what new messages have been received, and so on).

At some point after the message has been sent and processed, the message sending thread in node A unexports the receive buffer it has used by tearing down or modifying the OMMU entry for the previously imported memory (step 118).

Node B, responds to either the receipt of the short message and/or the trigger message by processing the received short message and then the main data portion of a received long message, if any (step 120). In addition, or as part of step 120, Node B will also modify or tear down the IMMU entry for the receive buffer (step 122) so as unexport the receive buffer and enable write access to the receive buffer by a message processing application program.

As indicated above, there is an alternate message sending technique in which a message is written locally to a local buffer, a "cookie" or other notification message is sent to the receiving system, and the receiving system then performs a remote read operation to read the message from the remote memory location indicated in the notification message. This message transmission technique has the same basic problems, due to the use of remote read operations, as the message sending technique described with respect to FIG. 5.

Of course, the prior art includes many variations on the sequence of operations described above with reference to FIG. 5 for performing remote write operations. However, the steps described are typical for distributed computer system using UNIX™ (a trademark of SCO) type operating systems, such as Solaris™ (a trademark of Sun Microsystems, Inc.).

SUMMARY OF THE INVENTION

The present invention is a system and method for performing remote write operations, and for sending messages from one node to another in a distributed computer system. The distributed computer system typically has multiple computers or computer nodes, some of which may be part of a cluster of computer nodes that operate as a single server node from the viewpoint of computers outside the server cluster. At least some of the computers contain parallel communication links or interfaces for connecting those computers to other computers in the system.

A first computer sends a sequence of messages to a second computer using remote write operations to directly store each message in a receive FIFO in the second computer. Each message contains a semi-unique sequence number. The second computer, when processing the messages, retains information denoting the sequence numbers of the messages it has received and processed. The second computer also acknowledges each received message with an asynchronous acknowledgment message, and the first computer keeps track of which messages it has sent but for which it has not yet received an acknowledgment.

Whenever the first computer determines that it has failed to receive a message acknowledgment from the second computer in a timely fashion, or it needs to reuse previously used message sequence numbers, the first computer undertakes remedial actions to resynchronize the first and second computers. The process begins by prompting the second computer to flush and process all the messages in its receive FIFO, and then comparing sequence number information recorded by the second computer with the sequence numbers of the outstanding, unacknowledged messages sent by the first computer. If the comparison indicates that any messages sent by the first computer were not received and processed by the second computer, those messages are re-transmitted. If necessary, during resynchronization the first computer will activate a different communication interface than the one previously used so as to establish a reliable connection to the second computer.

Once it is established that all previously sent messages have been received and processed by the second computer, normal "send only" message operation resumes. The resynchronization process ensures that each message is received and processed by the second computer once and only once. At predefined times, such as the successful conclusion of a resynchronization, the sequence number information retained by the second computer is cleared.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention is directed at a method of making fully reliable message transmission operations idempotent and efficient, especially in an environment in which at least some of nodes of the system have parallel links to the network fabric and in which it is known that remote write operations are highly (but not fully) reliable. One such environment is the server cluster environment shown in FIG. 6.

Server Cluster

Figure 6:
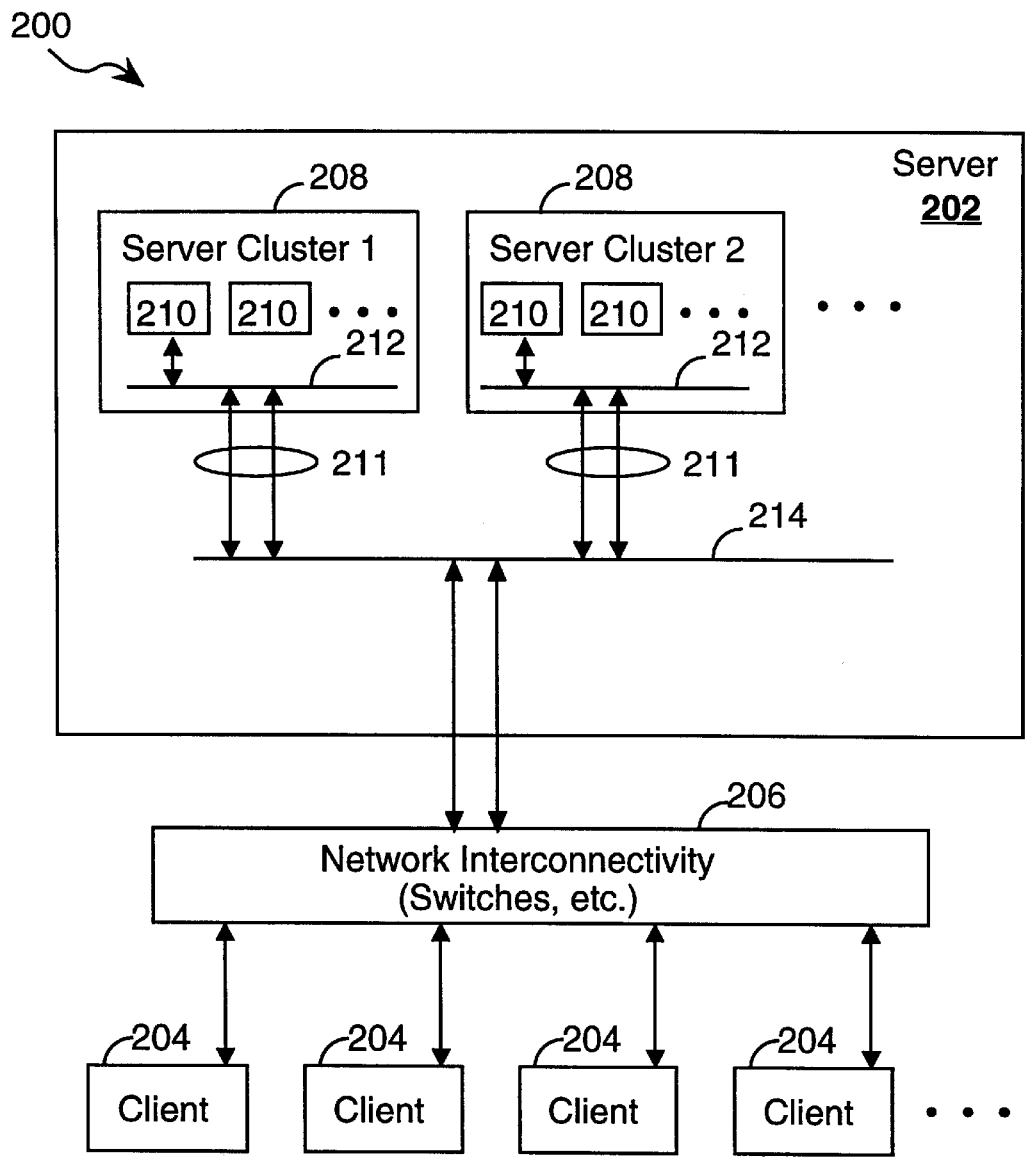
FIG. 6 depicts a computer system having a cluster of computers operating as a single server node.

Referring to FIG. 6, there is shown a distributed computer system 200 that includes a multi-CPU server 202 and numerous client computers 204 that are coupled to the server via one or more communication networks 206. The server 202 includes one or more a clusters 208 of computers 210 so as to provide more computational services to the clients 204 than could be provided by a single server computer. The server 202 is sometimes referred to as "the server cluster." For the purposes of the present document, it is irrelevant whether two server computers 210 that need to share information are in the same or different clusters 210.

Figure 1:
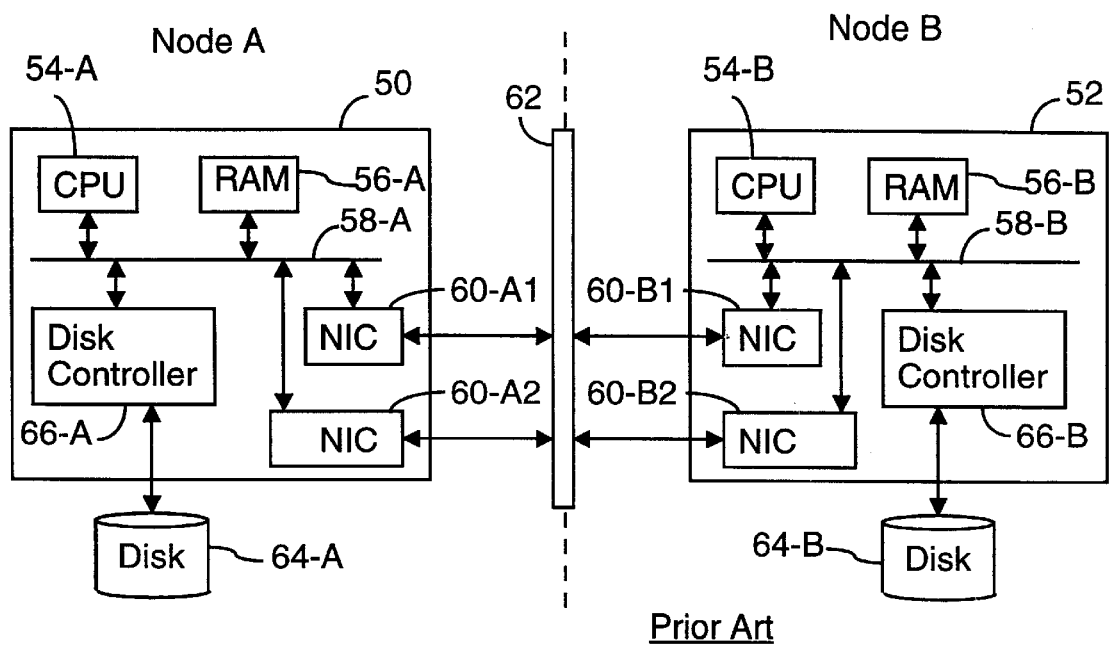
FIG. 1 is a block diagram of two computer nodes in a computer network.
Figure 2:
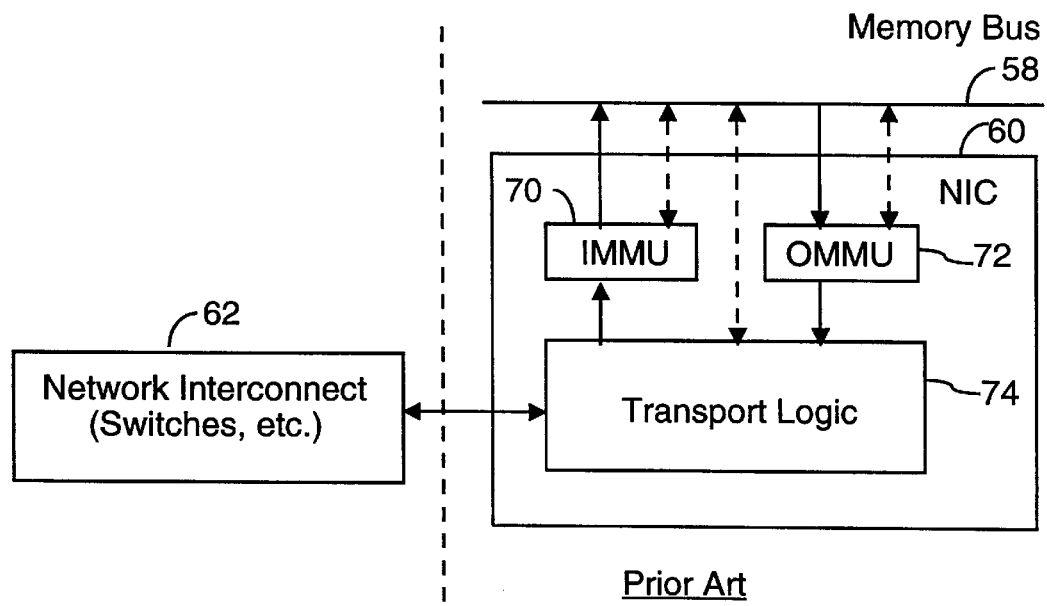
FIG. 2 is a block diagram depicting the components of the communications interface found in each computer of a computer network, such as the one shown in FIG. 1.
Figure 3:
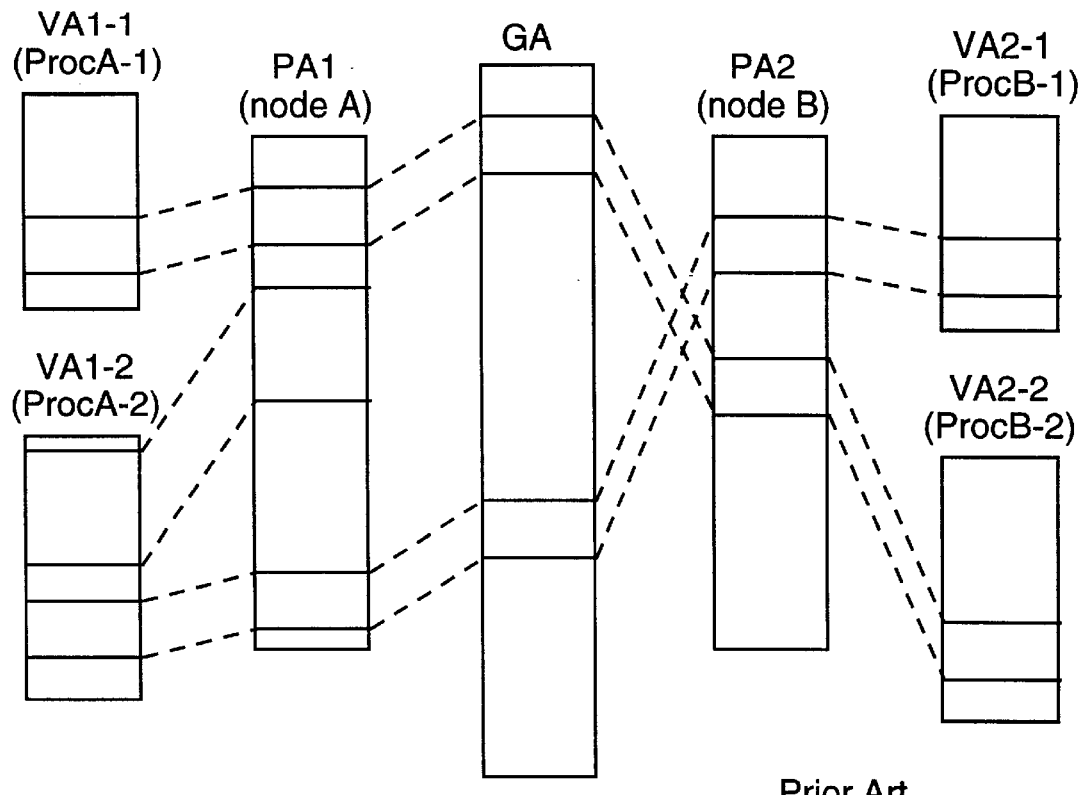
FIG. 3 depicts virtual, local and global address spaces and mappings between those address spaces.
Figure 4:
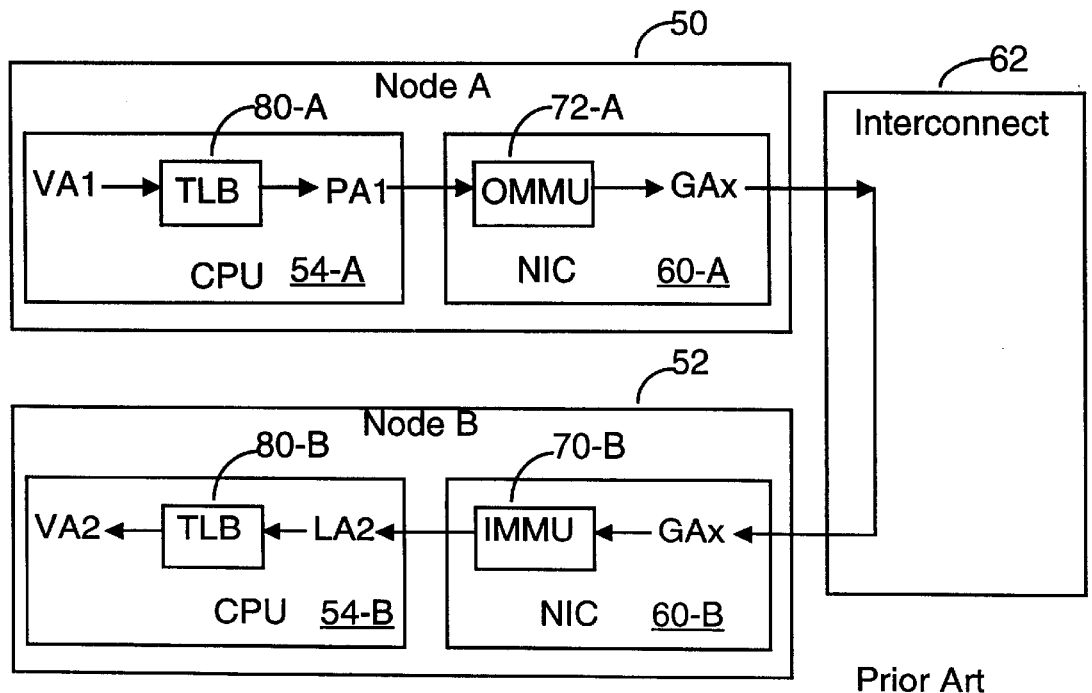
FIG. 4 is a block diagram of the computer modules used to perform address translations associated with transmitting data from a first node to a second node of a distributed computer system.

As shown in FIG. 2, at least some of the nodes of the server have been provided with redundant, parallel links 211 between the node's internal system bus 212 and the communication network 206. In some implementations, messages may also pass through an intermediate, server level bus 214 on their way to and from the communication network 206.

Computational and file serving tasks are distributed over the server's computers 210. As a result, the data needed by a process running on one server computer may be located in another server computer. Message communications between nodes within the server cluster 202 are fast and highly reliable, with error or failure rates typically less than one per million messages.

For the purposes of describing the present invention, the terms "sender" (or sending node) and "receiver" (or receiving node) will both be used to refer to computers 210 within the server 202. However, the present invention could also be used to perform remote writes between any "true" client computer 204 and a server computer 210 in the server cluster 202, so long as remote writes of data between the two computers are known to be highly reliable.

When message transmission failures occur at extremely low rates, such as less than once per million messages (having an average length of less than 4096 bytes), the use of remote read operations to verify the successful transmission of each message is costly. However, in order to provide reliable inter-node message communications, even highly occasional message transmission errors or failures must be automatically detected and corrected. The present invention provides a mechanism that avoids the need for performing remote read operations except (A) when performing synchronous remote write operations, and (B) to recover from apparent or real asynchronous message transmission failures.

Overview of Reliable Message Sending Procedure

Figure 7A:
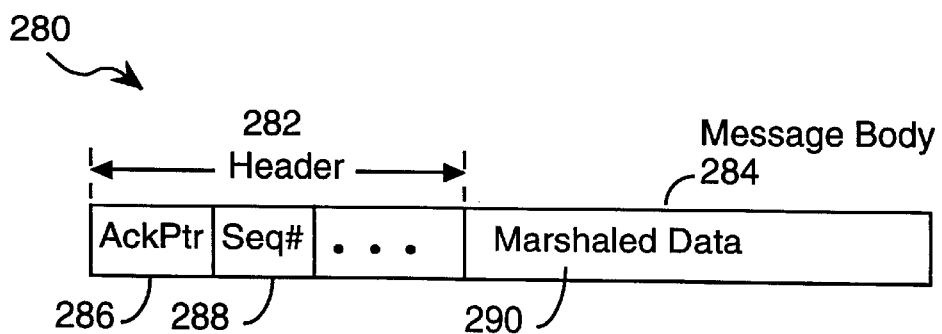
FIG. 7A depicts the data structure of a message transmitted from one computer to another.

FIG. 7A shows the data structure of a message 280 sent using the improved message sending procedure of the present invention. Each transmitted message 280 typically includes a header 282 and a message body 284. In the preferred embodiment, the message header includes an acknowledgment queue pointer (AckPtr) 286, the purpose of which is explained below, a sequence number 288, and an opcode 289. The message body 284 is used to store marshaled data 290. The message data structure in other embodiments may vary, but when using the present invention a sequence number 288, or an equivalent unique or semi-unique identifier, will be included in each message.

Figure 5:
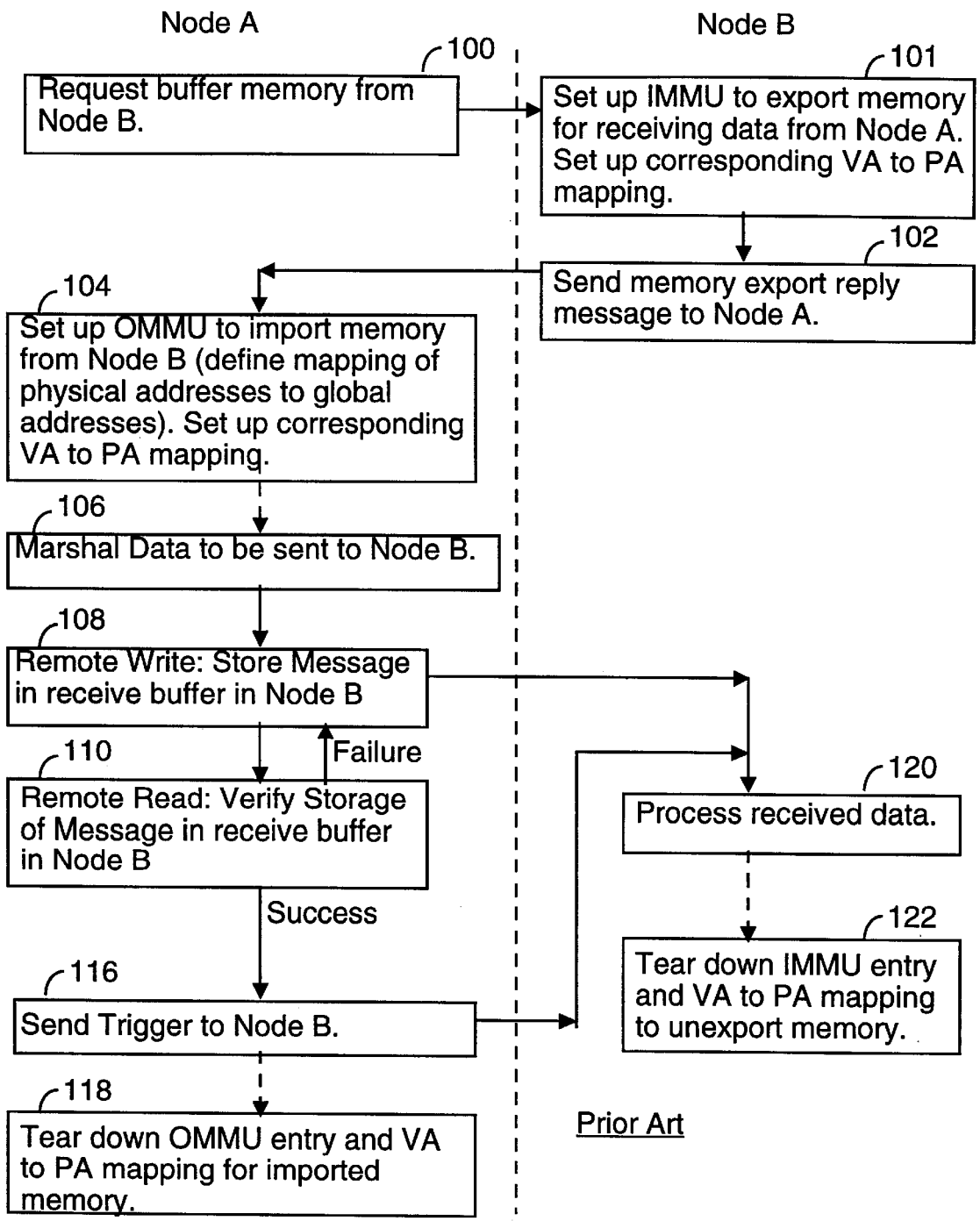
FIG. 5 is a flow chart of a conventional remote write procedure.
Figure 7:
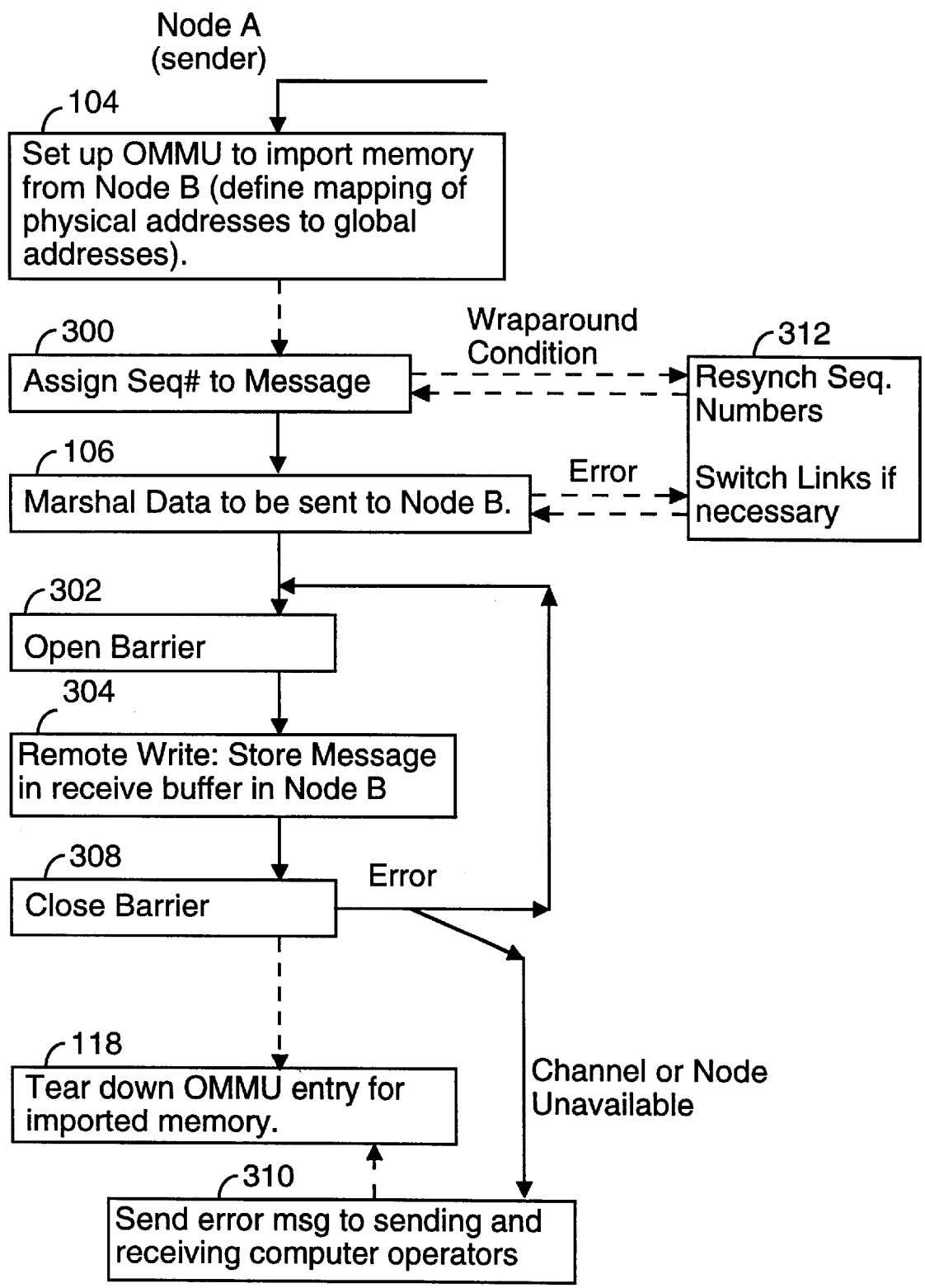
FIG. 7 is a flow chart of a reliable message sending procedure in accordance with one embodiment of the present invention.

FIG. 7 shows a highly simplified representation of the improved message sending procedure of the present invention. Since the steps performed by the receiving node are the same as those shown in FIG. 5 (except with respect to message sequence number tracking, as will be described in more detail below), only the steps performed by the sending node are shown. Some of the steps of this procedure are the same as those described above with respect to FIG. 5, and therefore assigned the same the reference numbers as in FIG. 5. New or modified steps are assigned new reference numbers.

The first step is for the sending node, when a memory export message is received, to set up an OMMU entry to import the memory being exported by the receiving node. (step 104). The OMMU entry set up at step 104 maps a range the global address range specified in the received memory export message to a corresponding range of physical memory in the server node. When FIFO receive buffers are being used, the mapped memory in the server node may be one or two memory words, representing the address used for writing data into a FIFO buffer.

Figure 8:
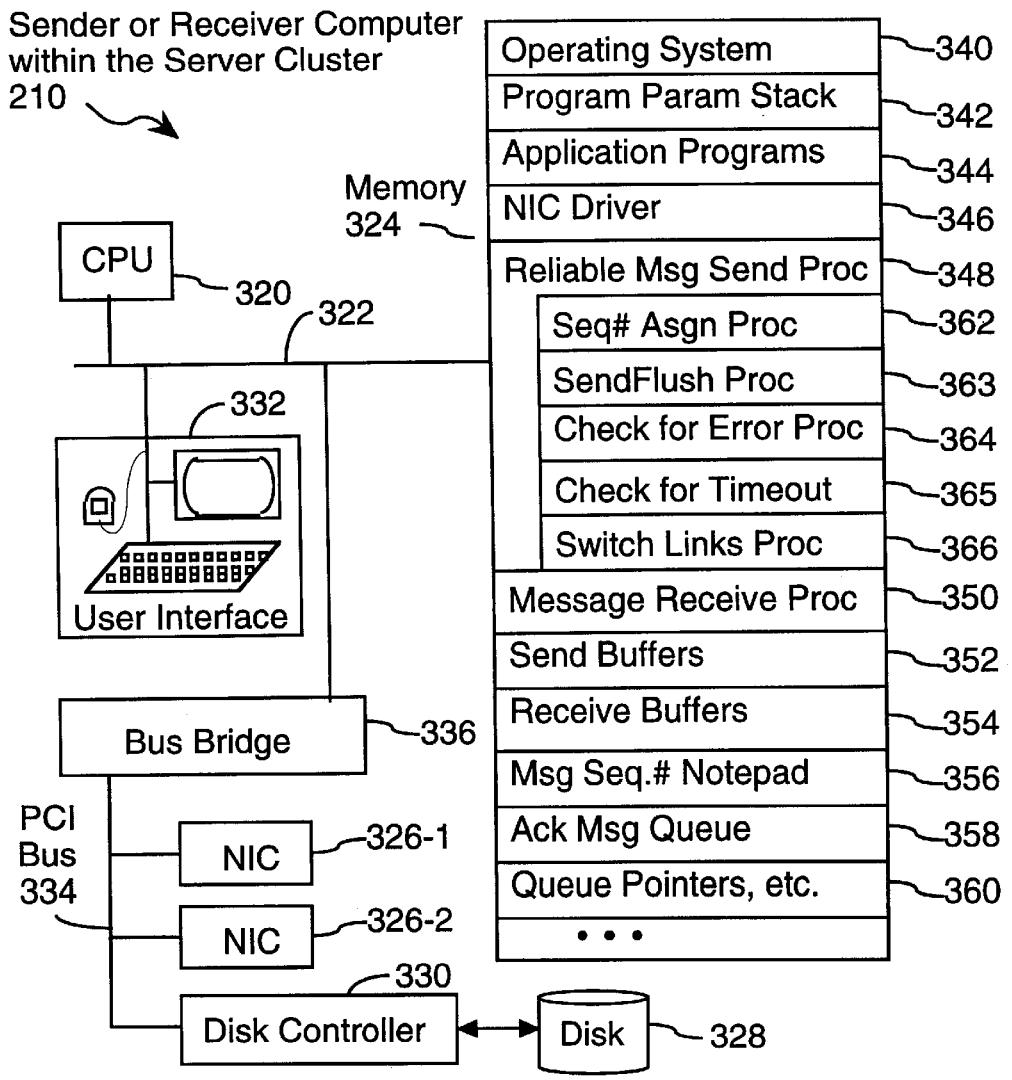
FIG. 8 is a block diagram of a computer incorporating a preferred embodiment of the present invention.
Figure 8A:
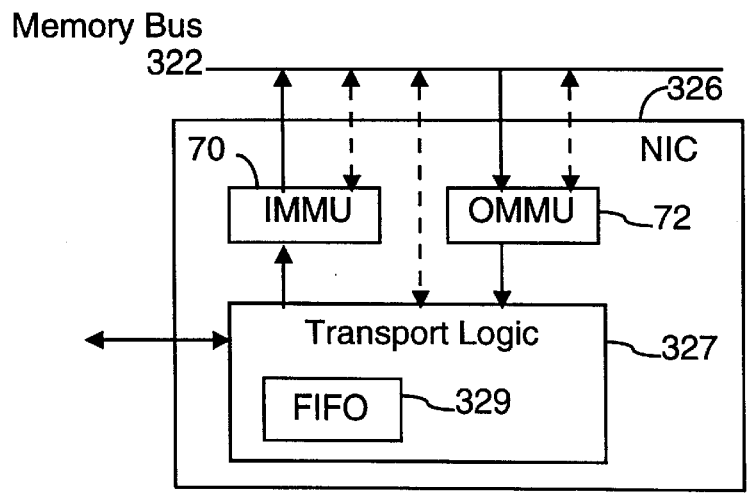
FIG. 8A depicts a network interface having a receive FIFO mechanism for receiving messages.

Referring to FIGS. 8 and 8A, in the preferred embodiment, two types of receive buffers are used: FIFO buffers 329 in the network interface cards (NIC's) and allocated buffers 354 in main memory. A FIFO buffer is a hardware supported mechanism for receiving messages. The actual buffer space used by a FIFO receive buffer may be located in the NIC, but is usually located in main memory. Typically, only the register to which data is written and the FIFO logic for managing the FIFO buffer are located in the NIC itself.

FIFO buffers are convenient because the sender always sends messages to the same physical address. The FIFO hardware takes care of storing the received messages in receive buffers or arrays in main memory 324 for sequential first-in-first-out processing by an appropriate message receive procedure 350. In other words, the FIFO buffer hardware 329 may include logic for storing received messages in receive buffers 354 in main memory. However, the storage location of messages "in the FIFO buffer" is unknown or transparent both to the sending computer and to the applications reading and processing the messages, because messages are written into the FIFO at a first memory mapped address, and read out of the FIFO at a second memory mapped address.

In the preferred embodiment, asynchronous messages are written to the address of the FIFO 329 in the receiving system's active NIC 326, while synchronous messages are written directly to a separately allocated buffer in main memory. Since synchronous messages require "end-to-end" acknowledgment, which is by definition inefficient, the primary focus of this discussion is the handling of asynchronous messages.

Asynchronous messages cannot be verified by performing a remote read, because the actual storage location of the asynchronous message in the receiving system is not known to the sending system. As a result, when the sending system detects an error condition indicating that a message may not have been successfully sent to the receiving system, it cannot resolve the issue by performing a remote read of a location in the receiving system where the message, or status information about the message, is stored.

Referring again to FIG. 7, once node A is ready to send a message to node B, a sequence number assignment procedure 362 (FIG. 8) assigns a sequence number 288 (FIG. 7A) to the message (step 300) and the message sending procedure in node A marshals the data 290 (FIG. 7A) to be sent to node B (step 106), which basically means that the data is formatted and stored in a local send buffer in a predefined manner suitable for processing by an application procedure in node B.

After the data to be sent is marshaled in a local buffer, an OpenBarrier(BarrierValue) procedure call is made (step 302). The OpenBarrie( ) procedure stores a network communications error event count (CEEcount) in a local variable (BarrierValue). When the corresponding CloseBarrier (BarrierValue) procedure is called at a later time, the current network communications error event count CEEcount is compared with the locally stored value BarrierValue. A return code of 0 is returned if the two are equal, and a nonzero return code (e.g., rc=1) is returned if the two are not equal.

The OpenBarrier and CloseBarrier procedures differ significantly from a remote read operation. The OpenBarrier procedure does not block continued operation of the executing thread whatsoever; and the CloseBarrier procedure blocks operation of the executing thread only until all pending remote write operations by the sending system's network interface (NIC card) have completed. The time duration of the blocking caused by the CloseBarrier procedure is very brief compared with the duration of the blocking caused by a remote read operation because the CloseBarrier procedure does not need to wait for the receiving system to perform any operations other than those performed by the receiving system's network interface (i.e., converting global addressed to local physical addresses and transmitting the data being written onto an internal bus of the receiving system using those local physical addresses, or storing the data in a FIFO).

The barrier instructions monitor error count values maintained by the packet level transport hardware and software that handle the mechanics of transmitting packets across a communication channel between computer nodes. The packet level transport hardware and software detect transmission errors, channel availability problems, and NIC card errors during packet transmission, and increments an error counter every time any type of error occurs that might indicate a packet was not successfully transmitted across the communication channel to its intended destination (e.g., a receive buffer or FIFO). Because the barrier instructions do not change the underlying timing or mechanics of performing a pure "remote write" to a specified memory location in a remotely located computer, the barrier instructions impose a smaller latency and resource usage burden than are imposed by a remote read operation.

After the OpenBarrier procedure is called, a remote write is performed to write the contents of the send buffer to the global addresses assigned to the receive buffer to which the data portion of a long message is being sent (step 304). Writing data to a global address causes the sending node's communication interface to transmit the data being written to the node associated with those global addresses, as indicated in the sending node's OMMU entry (or entries) for those global addresses. This data transmission operation (step 108) may be performed under direct CPU control by "programmed I/O" instructions, or it may be performed by a communications interface (NIC) DMA operation (i.e., in which case the DMA logic in the network interface handles the transfer of data from local physical memory to the communications network).

Once the remote write step 304 successfully completes a CloseBarrier(BarrierValue) procedure is called (step 308). If a return code of 0 is returned (indicating that no communication system errors occurred while the barrier was open), a trigger message (also variously known as a Wakeup message or interrupt message) is sent to Node B's network interface (step 116), which triggers the execution of a procedure in Node B for processing received messages (e.g., by inspecting the received message queue to determine what new messages have been received, and so on). If the CloseBarrier call returns a non-zero return code value, indicating a communications error occurred while the barrier was open, the procedure returns to step 302 to repeat the transmission of the message. If after a predetermined number of iterations the data transmission continues to be unsuccessful, an error message is sent to the operators of the sending and receiving computers to indicate a message transmission failure (step 310).

At some point, such as the connection between the two nodes is shut down, the message sending thread in node A unexports the receive buffer it has used by tearing down or modifying the OMMU entry for the previously imported memory (step 118).

At certain times, the sending node may initiate a process (herein called resynchronization) for checking that all previously sent messages have been received and processed by the receiving node. Resynchronization (step 312) is performed as seldom as possible, because it decreases system performance. One condition, which is not indicative of an error, that can initiate resynchronization is called sequence number wraparound. A sequence number wraparound condition occurs whenever it will be necessary for the receiving system to clear its sequence number notepad, generally because the sending system is about to send it messages having sequence numbers previously used, or which need to be recorded in the same places in the notepad as the sequence numbers in previously sent messages. Two examples of wraparound conditions are as follow:

The sending system uses a sixteen-bit field to designate the sequence number, enabling it to use $2^{16}$ (i.e., 65,536) unique sequence numbers. Whenever the next sequence number to be assigned "wraps around" to zero, a wraparound condition occurs.

The sending system alternates between using odd sequence numbers and even sequence numbers (e.g., by sending thousands of messages with a sequence of odd sequence numbers, and then sending thousands of messages with a sequence of even sequence numbers, and so on). A "wraparound condition" occurs whenever the sending system sends and the receiving system first receives a message with a sequence number that is of the opposite "type" (i.e., odd or even) as the sequence number in the immediately, previously received messages.

When a wraparound condition occurs, the sending and receiving systems need to "resynchronize." Resynchronization in the context of the present invention means making sure that all previously sent messages have been received and processed by the receiving system before sending a next set of messages. The resynchronization procedure, will be described in detail below.

A second condition that can require resynchronization is detection by the sending system that the receiving system has failed to acknowledge receipt of one or more messages. As indicated in FIG. 7, this condition is typically detected while preparing to send a message. However, the failure to receive message acknowledgments can also be detected by a "timeout" detection procedure which periodically checks to see if any messages have been unacknowledged for more than a predefined timeout period. Both of these error detection methods are described in more detail below.

A third condition that can cause resynchronization, is failure of a communication link, requiring the switch over to a parallel communication link. A link failure may be the underlying cause of the second condition mentioned above (i.e., failure to receive message acknowledgments). Whenever a link switch over occurs, the sending and receiving systems needs to resynchronize before any messages are sent over the newly activated link to make sure that all previously sent messages have, in fact, been received and processed by the receiving system.

FIGS. 8 and 8A shows a block diagram of a computer 210 within the server cluster 200 (see FIG. 6). The computer 210 can be either a sending or receiving node with respect to a particular remote messaging operation. The computer 210 includes a CPU 320, an internal communication or memory bus 322, random access memory 324, a pair of communications or network interfaces (NIC) 326, and a non-volatile, non-random access memory device 328, such as a high speed magnetic disk, and a corresponding disk controller 330.

In a preferred embodiment, the network interfaces 326 and disk controller 330 are coupled to a PCI bus 334 that is, in turn, coupled to the main memory bus 322 by a bus bridge 336. The computer's memory 324 stores, usually in conjunction with the disk storage device 328:

- an operating system 340 (e.g., Sun Microsystems' Solaris™ operating system);
- a program parameter stack 342 for each thread, used to pass parameters during procedure calls and returns, as well as other purposes well known to those skilled in the art;
- application programs 344, including application programs that can initiate the allocation of send and receive buffers, initiate the transmission of messages to another node, request data from a remotely located disk storage device, and so on;
- a NIC driver 346 for controlling the network interfaces 326 and for managing use of the IMMU and OMMU therein (FIG. 8A);
- a reliable message sending procedure 348 (which is preferably implemented as part of the operating system 340) for sending messages to a remote node;
- a message receive procedure 350 (which is preferably implemented as part of the operating system's kernel) for processing received messages (i.e., passing them to appropriate applications for processing);
- send buffers 352 for marshaling data and messages to be sent to another node;
- receive buffers 354 for receiving data from other nodes;
- a sequence number "notepad" 356 for keeping track of the sequence number of messages received from another node;
- an ack message queue 358 for storing data indicating the status of messages transmitted to other nodes; and
- message and ack queue pointers and local variables 360 for managing use of the ack message queue.

The operating system preferably includes, either as part of the reliable message sending procedure 348 or separately, the following procedures that are used during message transmission:

- a sequence number assignment procedure 360, described below with reference to FIG. 12, for assigning sequence numbers to messages;
- a SendFlush procedure 363 for sending a FIFO flush command to a receiving node, for resynchronizing the sending and receiving nodes;
- a "Check for Error" procedure 364 that is used to recover from a failure to receive a message acknowledgment;
- a "Check for Timeout" procedure 365 that is used to determine if any message acknowledgments have note been timely received; and
- a "Switch Links" procedure for activating a different communication link than the one which was last being used.

Received Message Queue and Ack Message Queue Data Structures

Figure 9:
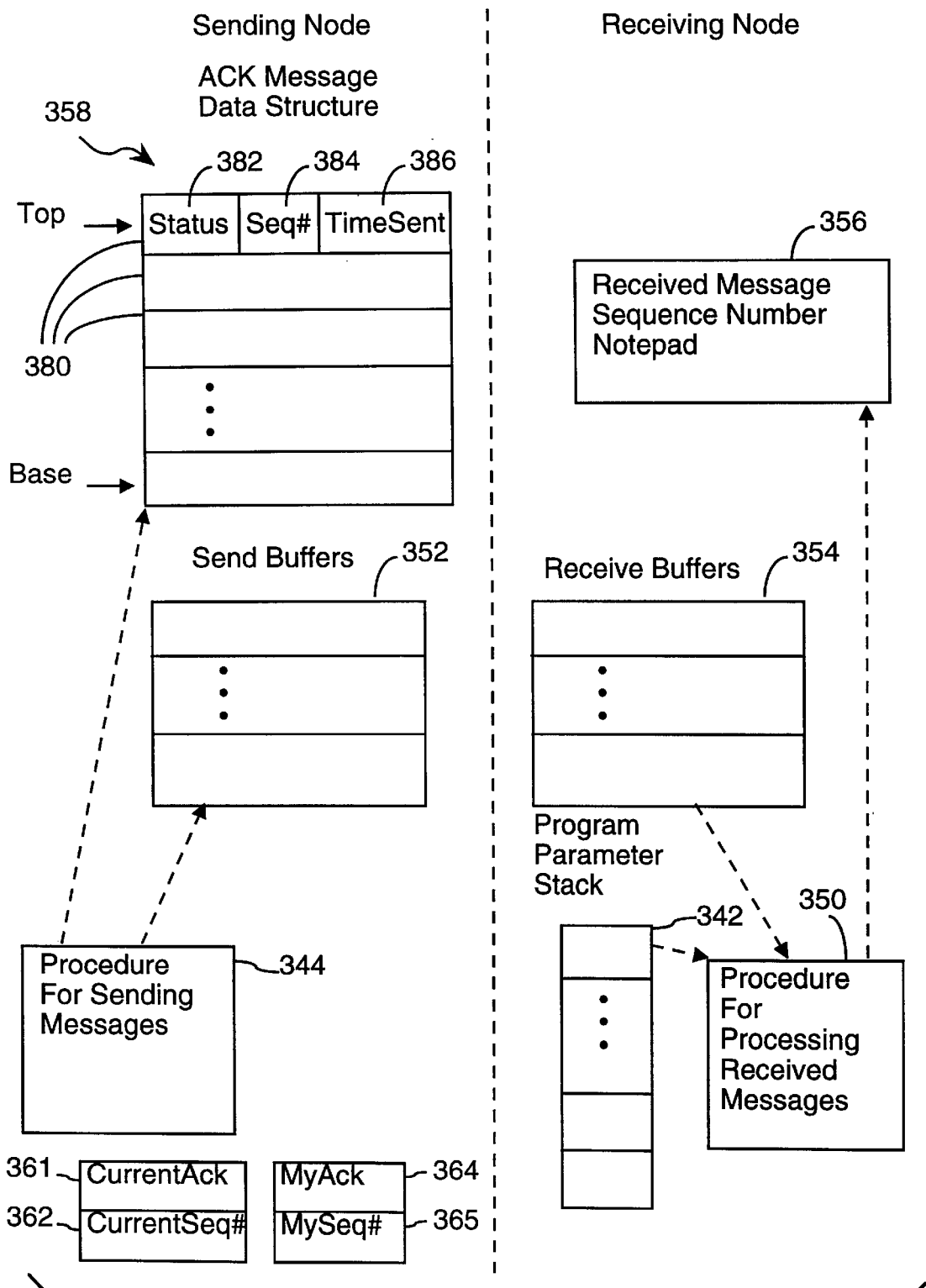
FIG. 9 depicts some of the primary data structures used in a preferred embodiment of the present invention.

Referring to FIG. 9, each computer which can send and receive messages includes an Ack message queue 358. This data structure consists of a set of N (e.g., 16 or 32) ack entries 380, each of which is used to keep track of the status of one message transmitted to another node. Each ack entry 380 includes the following information fields:

- Status 382, which can have one of two values: Msg_Sent, which indicates that a message was sent, but has not yet been acknowledged by the receiving node, and Msg_Empty, which indicates that the corresponding message has been acknowledged and processed by the receiving node.
- Message Sequence Number (Seq#) 384, which is used to identify a previously sent message. Sequence numbers are preferably assigned sequentially to messages by the sending node. More precisely, the operating system assigns message sequence numbers to applications upon request. The amount of time that passes from when the application requests the sequence number to the time it submits the message for transmission may vary. In fact, an application may even cancel its plan to send a message after receiving a sequence number from the operating system. As a result, messages may not be transmitted in the same order that their sequence numbers are assigned, and therefore the entries 380 in the ack message queue 356 may not have sequentially ordered sequence numbers. The Seq# field 384 is used to help determine whether or not the node to which a message has been sent has actually received the message. In particular, when the sending system attempts to reuse a slot in the ack message queue 358, after sending N−1 other messages since the last time it used that same slot, and the status of the slot is Msg_Sent, the sending system can ask the receiving system to verify whether or not it received a message with a sequence number equal to the number in the Seq# field 384 of this slot. This will be described in more detail below.
- TimeSent 386, which represents the time at which the corresponding message was transmitted to a destination node. When a message's transmission is not acknowledged within a certain amount of time of its transmission, special measures are undertaken (as explained below) to resolve the problem.

The pointers and generation values maintained at each node are as follows:

- CurrentAck 361 is a pointer to the ack queue entry currently being used;
- CurrentSeq# 362 is the sequence number assigned to the message being processed;
- MyAck 364 and MySeq# are "local" copies of the CurrentAck 361 and CurrentSeq# values, used for keeping track of the ack queue entry for the last message sent.

Each time a message is transmitted, (A) the sending node stores corresponding values in an ack queue entry 380, (B) the CurrentAck 361 value is copied to MyAck 364, the CurrentSeq# 362 value is copied to MySeq# 365, and (C) a bump( ) procedure is called that advances the CurrentAck 361 pointer to the point to the next ack queue entry. If the current ack entry is the top entry in the ack message queue, the bump( ) procedure resets the CurrentAck 361 pointer to point to the base ack message queue entry.

In one embodiment, the received message notepad 356 consists of a bitmap for a defined space of sequence numbers. Every time a message is received and processed, the bit in the bitmap corresponding to the sequence number in the message is set. At certain times, as described below, the bitmap is transmitted to the sending system. At other times the bitmap is cleared and the process of marking or setting bits in the bitmap begins anew.

In alternate embodiments, the received message notepad 356 may use sparse data storage techniques for indicating the sequence numbers in received messages. For instance, the message processing procedure 344 could maintain the start and end points of contiguous sets of received sequence numbers, along with a list of up to N "exceptions" (i.e., sequence numbers missing from the contiguous range):

(start1, end1, exceptions 1 to N) (start2, end2, exceptions 1 to N)
. . . .

If sequence numbers are assigned and used in sequential order, the above mentioned sparse data storage technique may be more efficient than the bitmap technique.

Since each node both sends and receives messages, each node has one complete set of the sending node data structures for each other node to which it sends messages, and also has one complete set of the receiving node data structures for each node from which it receives messages.

Preferred Embodiment of the Message Send Procedure

For the purposes of this document it will be assumed that asynchronous messages are written to a FIFO in the receiving system, and that the sending system has no information as to where those messages are actually stored in the receiving system. Further, it is assumed that the receiving system processes the received messages in the same order they are stored in the receiving FIFO, but this latter assumption is not critical to the operation of the invention.

Figure 10A:
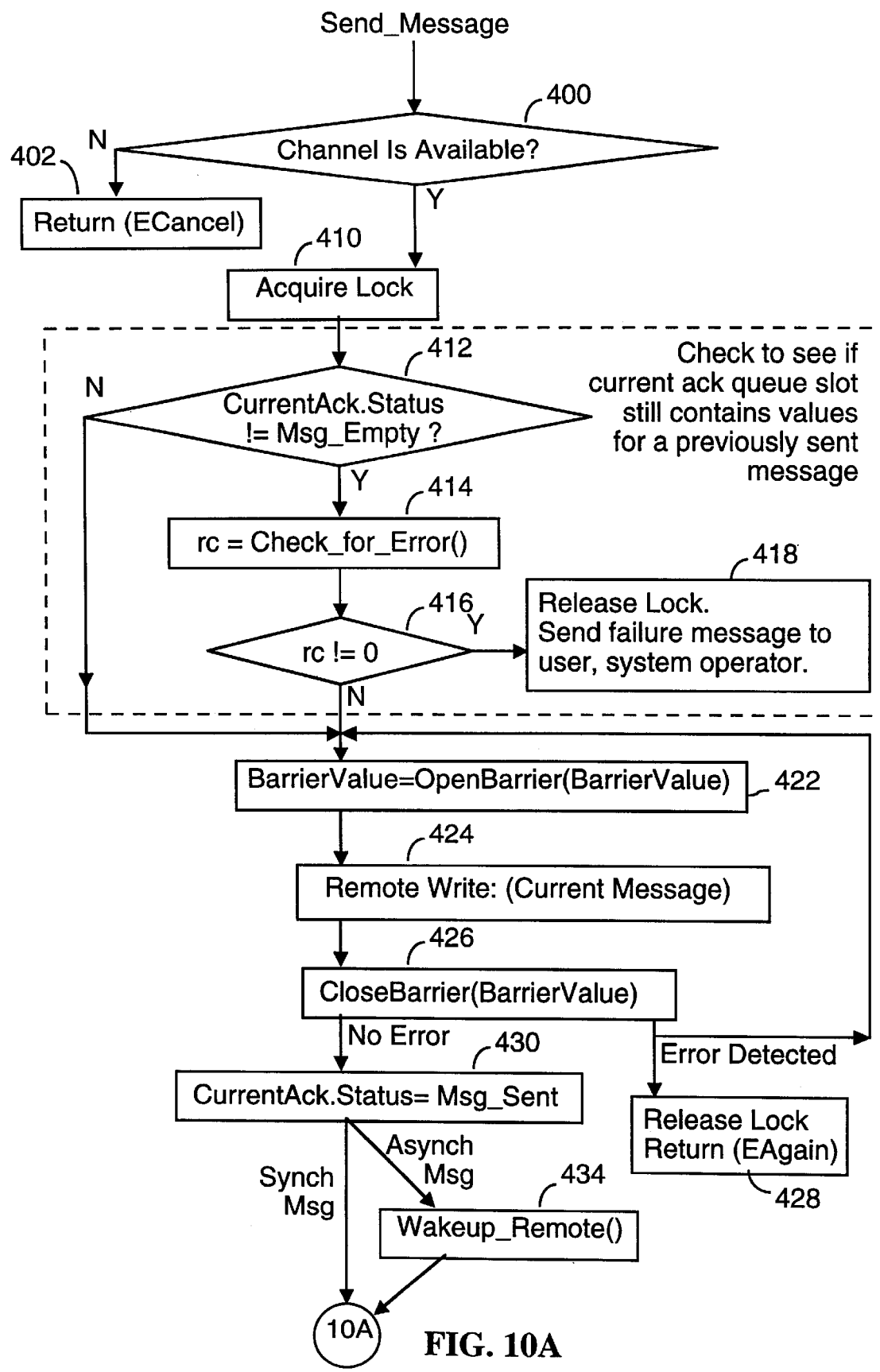
FIGS. 10A and 10B depict a flow chart of procedure for sending a message to a remotely located node in a preferred embodiment of the present invention.
Figure 10B:
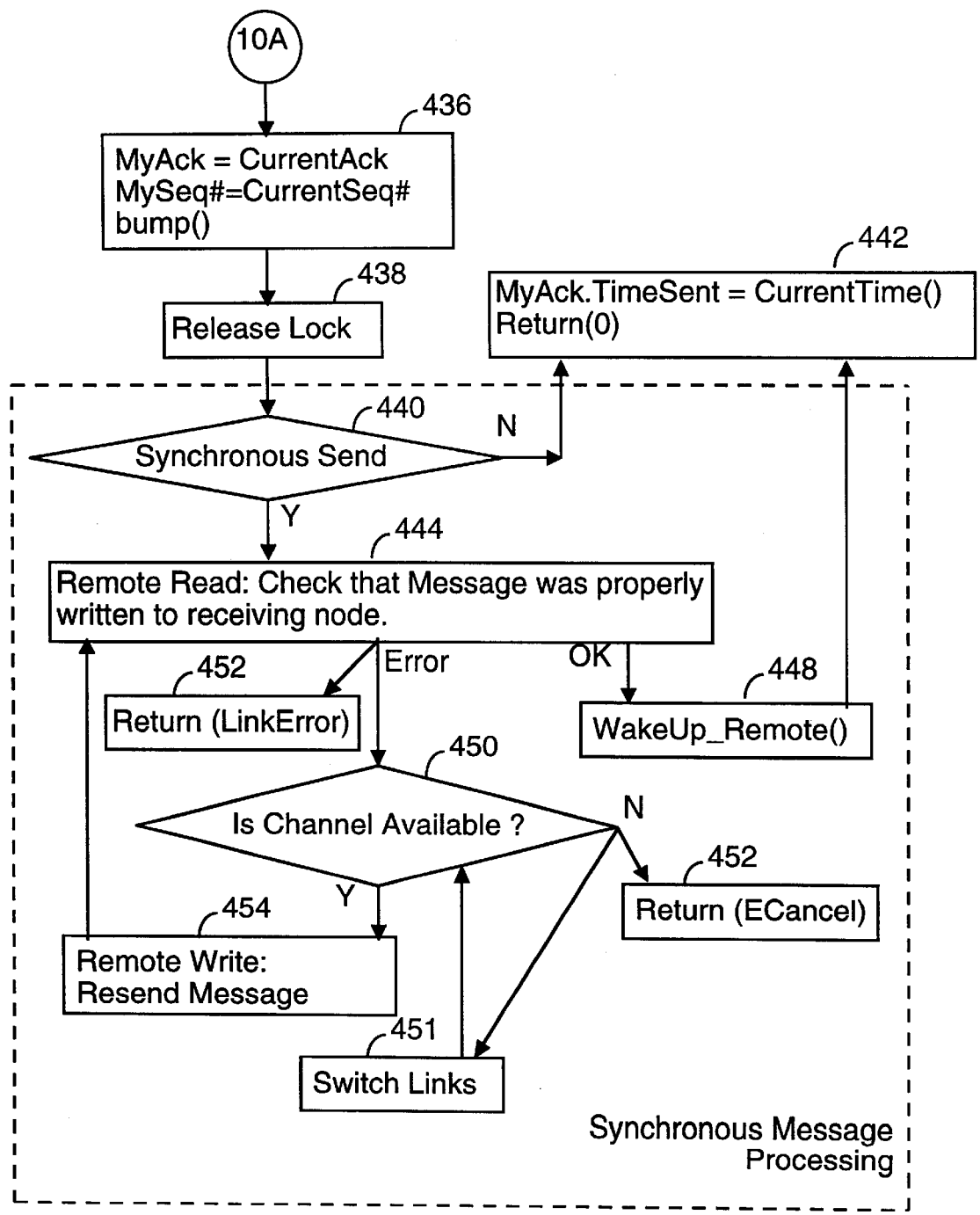

Referring to FIGS. 10A and 10B, the Send Message procedure determines (400) if the communication channel required for transmitting a message to its remote destination node is available. If the communication channel is not available, the procedure exits with a return code of ECancel (402), which signals the calling routine that the communication channel was not available. Typically, the calling routine will retry sending the short message a number of times, separated by a predefined time interval until an external monitoring process determines that the communication channel is not working properly. At that point, the monitoring process may activate a different communication link than the one that isn't working, and call the SendFlush procedure to resynchronize the sending computer with the receiving computer.

If the channel is available, the procedure continues. The procedure will return one of three return codes (rc):

rc=0, meaning that the message was written to the remote node without incurring any communications system errors. This means the message was actually stored in the remote node.

rc=LinkError, indicating a communication system error was detected during transmission of the message, and the system was unable to correct the error, even after several tries, including switching communication links (i.e., activating a different communication interface than the one previously activates).

rc=ECancel, meaning that the communication hardware has indicated to the send message procedure that a communication channel is not available.

If Send_Message procedure returns a return code (rc) of 0, this tells the calling procedure that the message was written to the remote node. If the Send_Message procedure returns a return code (rc) of LinkError, this tells the calling procedure that neither of the system's two communications interfaces has been able to send the message. This tells the calling procedure that it should either restart the entire message transmission procedure, wait for a while and then restart the procedure, or take some other remedial action. If the Send_Message procedure returns a return code of ECancel, this means that the communication hardware is indicating that a communication channel is not available.

There is a single message transmission "lock" for each ack message queue, which is shared by all the procedures using the ack message queue and which protects the ack message queue from two procedures acting on the ack message queue simultaneously. The lock is generally an operating system primitive, the specific implementation of which depends on the operating system being used by the computer in which the present invention is implemented.

In the flow charts of FIGS. 10–16, and in the following text, the symbol "!=" means "not equal." Thus the conditional statement:

If CurrentAck.Status !=Msg_Empty
{do X} indicates that if CurrentAck.Status is not equal to Msg_Empty, operation X is performed.

The Send_Message procedure begins by acquiring the lock for the ack message queue (step 410), which means that the procedure waits at step 410 as long as necessary until it acquires the lock. Steps 412–418 check to see if the current ack queue entry pointed to by the CurrentAck pointer (see FIG. 9) still contains valid values for a previously sent message. In particular, if the CurrentAck.Status is equal to Msg_Empty (412-N), the status information in the current ack queue entry (for a previously sent message) is no longer needed and processing continues at step 422.

Otherwise (412-Y), the sending system has not yet received an acknowledgment from the receiving system for the previously sent message whose status information is still stored in the current ack queue entry. As a result, the Check_for_Error procedure is called (414), which will be described later with respect to FIG. 15. If the Check_for_Error procedure returns a nonzero return code (416-Y), the lock is released, a failure message is sent to the user and/or system operator (418), and the procedure exits, passing the Check_for_Error procedure's return code as its own return code. If the Check_for_Error procedure returns a zero return code (416-N), that means that it has been determined that the previously sent message has been received and processed by the receiving system, and thus processing of the current message can continue at step 422.

An OpenBarrier(BarrierValue) procedure is made to "protect" the transmission of the message (step 422). Next, a remote write is performed so as to send the current message to the receiving system (424). If the message is asynchronous, it is stored in a receive FIFO of the receiving system, and if it is a synchronous message it is written into a receive buffer in the receiving system's main memory. Thus, if successful, the message will be stored in a receive buffer somewhere in the receiving system. Then a CloseBarrier(BarrierValue) procedure call is made (step 426) to determine if any communication system errors occurred during transmission of the message. If a communication system error is detected, the barrier message sending steps (422, 424, 426) are repeated up to some predetermined number of times (e.g., two or three). If the message transmission is still unsuccessful after a couple of tries, the lock is released and the Send_Message procedure exits with a return code of EAgain (step 428), indicating that the message transmission failed due to an error detected by the barrier instructions.

If a communication system error is not detected, the status value in the current ack entry is set to "Msg_Sent" (430), to record the fact that the message was sent. Then, if the message is an asynchronous message, a trigger (interrupt) message is sent to the receiving system (434), which in turn prompts the receiving system to execute its procedure for processing messages in the received message queue. In some alternate embodiments, trigger messages may not be used.

After the message has been sent, the Send_Message procedure makes a local copy of the CurrentAck pointer and the CurrentSeq# value in the MyMsg and MySeq# local variables. In addition, the bump( ) procedure is called so as to advance the CurrentAck pointer (436). As a result, the MyAck and MySeq# local variables retain information about the last sent message.

At step 438 the lock is released, enabling other threads of execution in the sending computer (node) to initiate the transmission of additional messages.

In one preferred embodiment, the local copy of each sent message (e.g., stored in send buffer 352) is not deleted until an acknowledgment message is received from the receiving system, but the transmission of subsequent messages is not dependent on the receipt of that acknowledgment message. In other words, the sending system continues sending messages without regard to the return of acknowledgment messages, until the sending system encounters an ack queue slot that has not been set to Msg_Empty by the receiving system.

In an alternate embodiment, when barrier instructions are used (see steps 422, 426 of FIG. 10A), the successful transmission of a message is inferred from the lack of a barrier error, and the local copy of each sent message is deleted upon the CloseBarrier instruction returning without error. In this alternate embodiment, steps 412, 414, 416 and 418 are eliminated.

A further optimization, not shown in the FIGS. 10A, 10B, is that the Wakeup_Remote procedure call (i.e., for sending a trigger message) in step 434 is preferably performed only if (A) the last sent message is represented by the base entry in the ack message queue, or (B) the message sent before the last message has already been acknowledged by the receiving node, indicating that the receiving node's procedure for processing received messages may have exited or gone to sleep due to a lack of any messages to process. This optimization may, on rare occasions, cause a Wakeup (or trigger) message not to be sent when it should have been sent. However, the consequence of this are relatively minor since the receive node's procedure for processing received messages is periodically restarted by a timeout thread executing on the receiving node.

Synchronous messages are defined for the purposes of this document to be messages whose ordering with respect to other messages being sent by the same thread of execution in the sending computer cannot be changed, and further are messages where it must be known that the message has been received and processing has begun by the receiving node, enabling the sending node to rely on the successful transmission of the message before allowing the sending thread to perform any subsequent tasks. If the message being sent is not a synchronous message (step 440-N), the current time value, generated by the CurrentTime( ) procedure, is stored (step 442) in the TimeSent field of the ack entry for the last sent message (i.e., in MyAck.TimeSent, or in C language syntax, in MyAck→TimeSent).

If the message being sent is a synchronous message (440-Y), a remote read is performed to read the Seq# fields of the receive buffer where the last sent message should have been written (444). As explained above, remote reads are relatively expensive in terms of system latency and resource usage, and thus are not used in the present invention except where necessary.

If the Seq# field of the remotely read receive buffer is equal to the expected value (which is stored in the variable MySeq#), it is concluded that the receiving node did receive the transmitted control message, and the Wakeup_Remote( ) procedure is called once again (step 448) to send a trigger message to the receiving node. This trigger message is sent to help make sure the receiving node processes the just sent message in a timely fashion. After sending the trigger message, the current time value, generated by the CurrentTime( ) procedure, is stored (step 442) in the TimeSent field of the ack entry for the last sent message.

If the data retrieved by the remote read does not match the expected sequence number value (446-N), it is concluded that the receiving node did not receive the message sent at step 424. When this happens, the procedure checks to see if the communication channel is available (step 450) (i.e., to make sure there hasn't been communication channel failure). If the channel has failed, the Send_Message procedure attempts to correct the problem by switching communication links (451). The link switching may happen as part of a background process.

If a channel is still not available, the procedure exits with an error return code of ECancel (452) to indicate the unavailability of a communication channel. Otherwise, if a communication channel is available, the procedure attempts to fix the message transmission failure by resending the message (i.e., repeating steps 422, 424, 426) and then repeating the remote read (444). If the message still hasn't been correctly written in the receiving computer's memory, the Send_Message procedure exits with an error return code of LinkError (step 455), which tells the calling routine that a transmission error not detectable by the barrier instructions has occurred.

Receiving Node Procedure for Processing Incoming Messages

Figure 11:
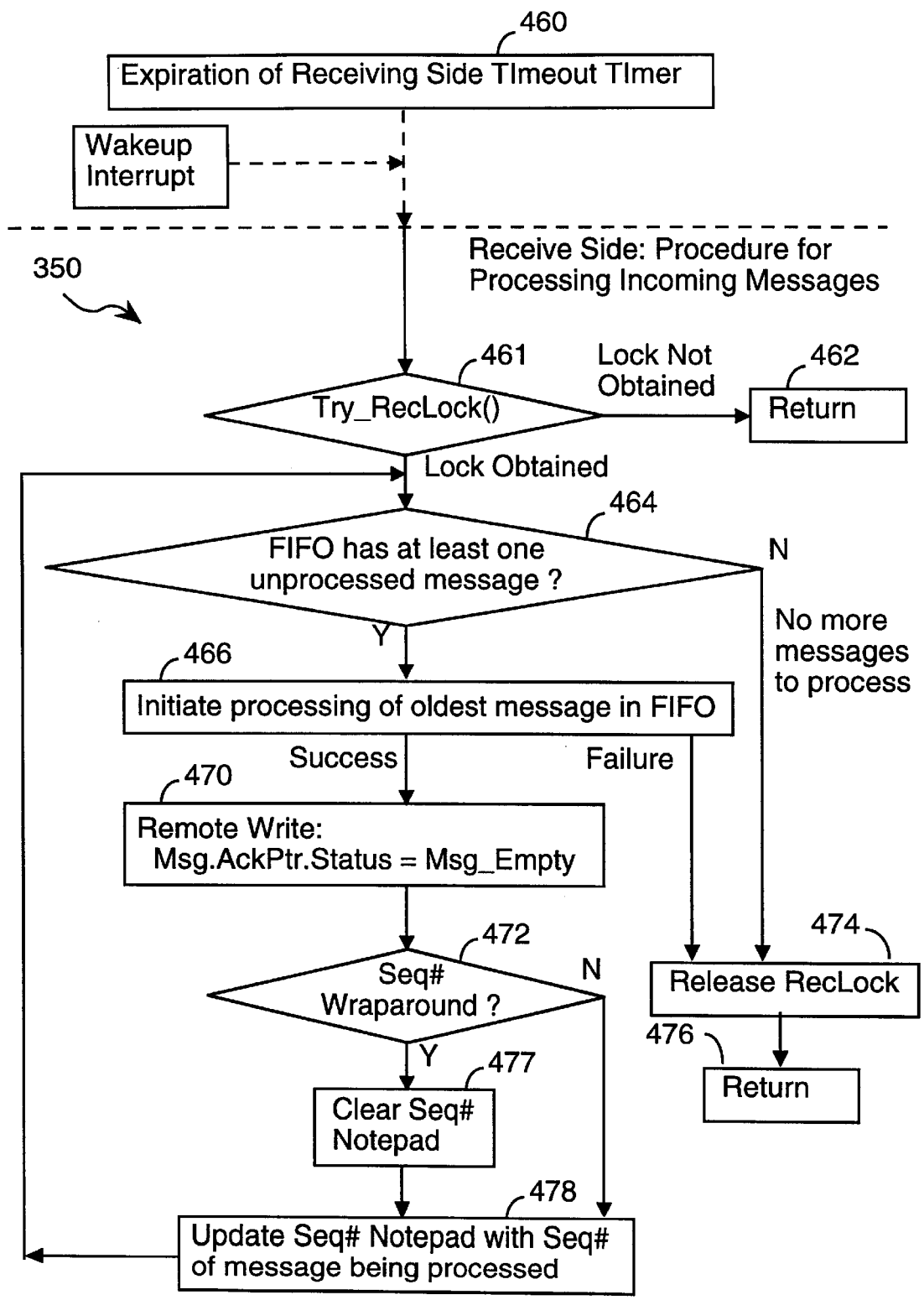
FIG. 11 is a flow chart of a "receive message" procedure for processing received messages in a preferred embodiment of the present invention.

Referring to FIG. 11, the receiving node procedure for processing incoming (i.e., received) messages is restarted periodically by a timeout thread (step 460). This procedure is also restarted whenever a Wakeup (or trigger) interrupt message is received from the sending system.

Upon restarting, the procedure tries to obtain a lock (herein called the RecLock) that corresponds to the received message buffer(s) in which messages are stored by the receive FIFO (step 461). If the lock is currently held by another thread, the procedure simply exits (step 462). If the lock is obtained, the receive FIFO is checked (i.e., the receive buffers used by the receive FIFO) to see if receive FIFO contains any messages to be processed (step 464). If there are no messages in the FIFO that require processing, the procedure releases the lock (step 474) and exits (step 476).

If the receive FIFO is not empty, then processing of the oldest message in the FIFO is initiated (step 466). In a preferred embodiment, processing of the message is initiated by copying it onto the stack and calling a procedure corresponding to an opcode value 289 (FIG. 7) in the message's header. However, the particular mechanism by which such processing is initiated depends on aspects of the receiving system not important to the present invention.

If processing of the current message cannot be initiated for any reason (e.g., the required resources may not be available), the procedure releases the received message queue lock (RecLock) (step 474) and exits (step 476).

Otherwise, if the processing of the current message is successfully initiated, the Status field of the Ack queue entry for that message is set to Msg_Empty (step 468), to indicate that the message has been processed. Further, the message processing procedure updates its sequence number notepad with the sequence number in the message being processed (478). Then the message processing procedure goes back to step 464 to process the next message, if any, in the receive FIFO.

In some embodiments, the message processing procedure checks the sequence number in the received message to see if it indicates that a sequence number wraparound condition has occurred (472), in which case it clears the sequence number notepad (477) before updating the sequence number notepad with the current message's sequence number (478). A sequence number wraparound condition may be defined as receiving a message with a predefined sequence number, such as zero, or as receiving a message with a sequence number meeting some other predefined wraparound criteria.

However, the sequence number notepad can be cleared in this manner only if there is a basis for knowing that all messages previously sent by the sending computer to receiving computer were successfully received and processed by the receiving computer. This can be implemented in a number of ways, such as the sending computer waiting to receive acknowledgments for all previously sent messages before sending a message with a predefined wraparound sequence number, or by the sending system receiving and analyzing a copy of the sequence number notepad (or a portion thereof) before sending the message with the predefined wraparound sequence number.

Sequence Number Assignment Procedure

Figure 12:
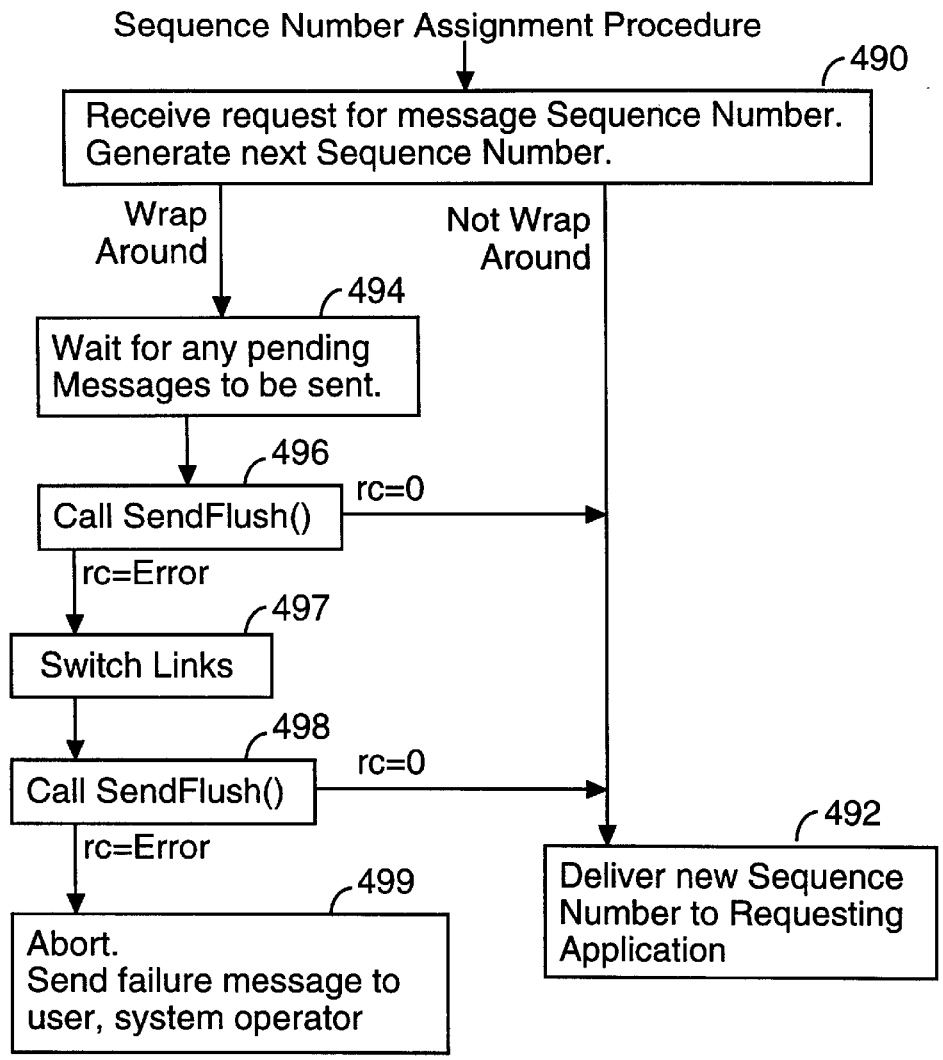
FIG. 12 is a flow chart of a procedure for assigning sequence numbers to messages and for handling wrap around of the sequence number.

Referring to FIG. 12, the procedure for assigning sequence numbers to messages is executed whenever a request is received from an application for a new message sequence number. Generally, a next sequence number is generated simply by incrementing the last generated sequence number (490). If this does not result in a wraparound condition, the new sequence number is delivered to the requesting application (or is inserted in the message, depending on where in the message generation process this procedure is called) (492).

When a wraparound condition occurs, the procedure waits for any pending messages (i.e., with previously assigned sequence numbers) to be sent (494). This step may not needed in implementations where sequence numbers are assigned by the communications interface driver immediately preceding message transmission. Then, a FIFO flush command is sent to the receiving system (496) by calling the SendFlush procedure, which will be described in detail next. If the SendFlush procedure returns without error, indicating that all previously sent messages have been received and processed by the receiving system, the new sequence number is delivered to the requesting application (or is inserted in the message) (492).

The SendFlush procedure returns an error code if it is unable to confirm that the receiving system has received all previously sent messages. In this case the sending computer "switches links" (497), which means that it activates a different communication interface (sometimes called a channel or link) than the one previously activated. This may require configuring the memory management units in the newly activated communication interface. After activating a new communications interface, the SendFlush procedure is called a second time (498). If the SendFlush procedure returns without error, indicating that all previously sent messages have been received and-processed by the receiving system, the new sequence number is delivered to the requesting application (or is inserted in the message) (492). Otherwise, the sending computer aborts the pending message transmission and sends an appropriate communications system failure message to the user and/or system operator (499).

SendFlush Procedure

Figure 13:
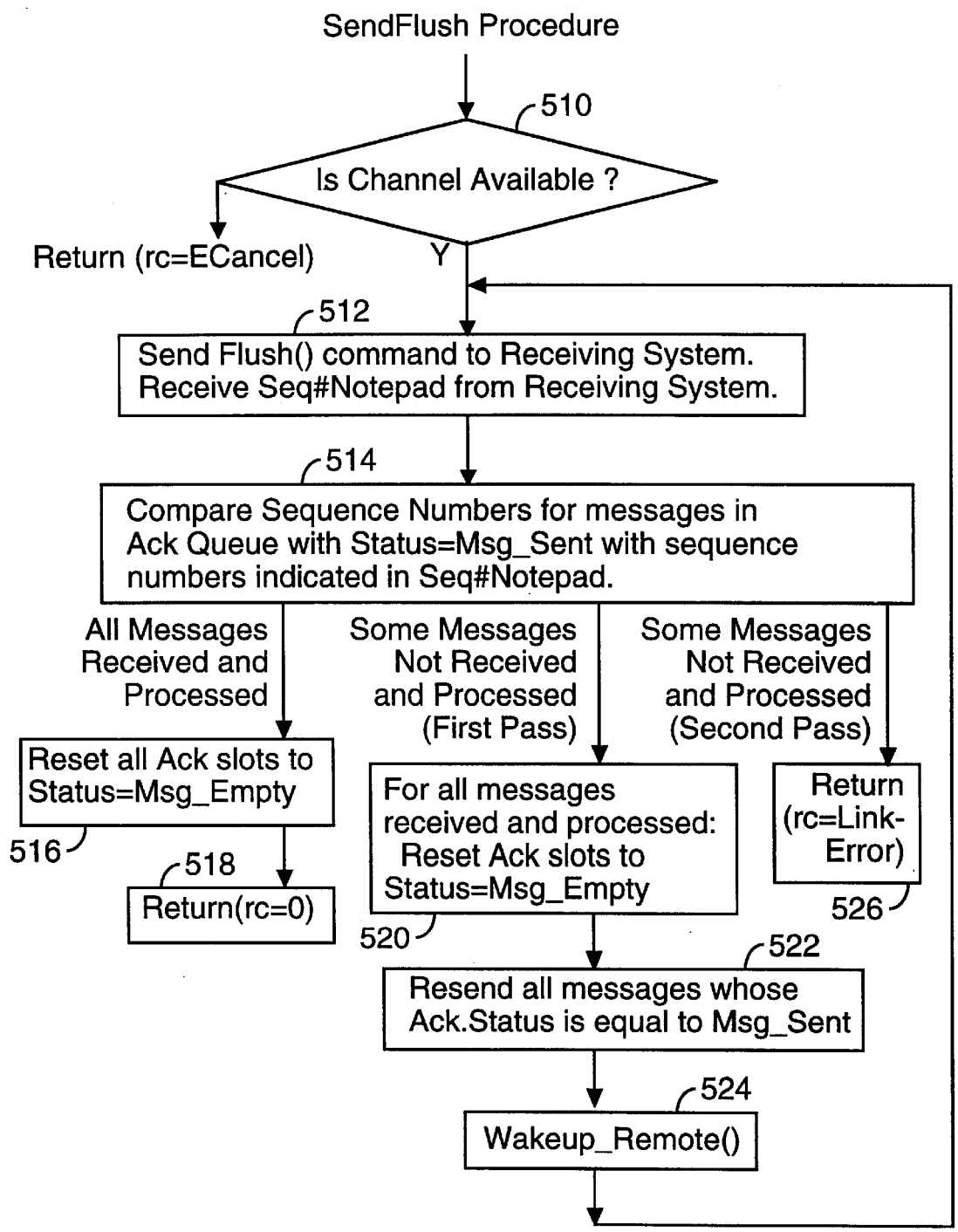
FIG. 13 is a flow chart of a procedure, executed by a message sending computer, for resynchronizing two computers with respect to the handling of previously transmitted messages.

Referring to FIG. 13, the SendFlush procedure begins by checking that a communication channel to the receiving system is available (510). If not, the procedure aborts with an appropriate error code. If a channel is available, a Flush command is sent to the receiving system as an end-to-end message, with the sending system receiving a copy of the sequence number notepad as part of the flush message acknowledgment by the receiving system (512).

The sequence numbers for any pending messages denoted in the Ack queue (i.e., messages whose entry has Status= Msg_Sent) are compared with the sequence numbers indicated in the sequence number notepad. If either there were no pending messages (i.e., all previous messages have been acknowledged) or the sequence numbers for all the pending messages are found in the received notepad copy, the sending and receiving systems are synchronized with respect to all previously sent messages. Therefore all Ack queue slots for pending messages can be cleared, or have their Status fields set to "Msg_Empty" (516), and the procedure exits (518).

If there is at least one pending message whose sequence number is not found in the received notepad copy, then remedial action is required. The Status field for those pending messages, if any, whose sequence number is found in the received notepad copy are set to "Msg_Empty" (520). The remaining pending messages whose status is "Msg_ Sent" are re-transmitted to the receiving system (522), and a trigger message is sent to the receiving system (524) to prompt it to process those messages. The procedure then recycles itself back to step 512 to send the flush command again to the receiving system. If at least one pending message remains unprocessed by the receiving system, even after their re-transmission (called the second pass in the Figure), the procedure exits with an error return code.

Figure 14:
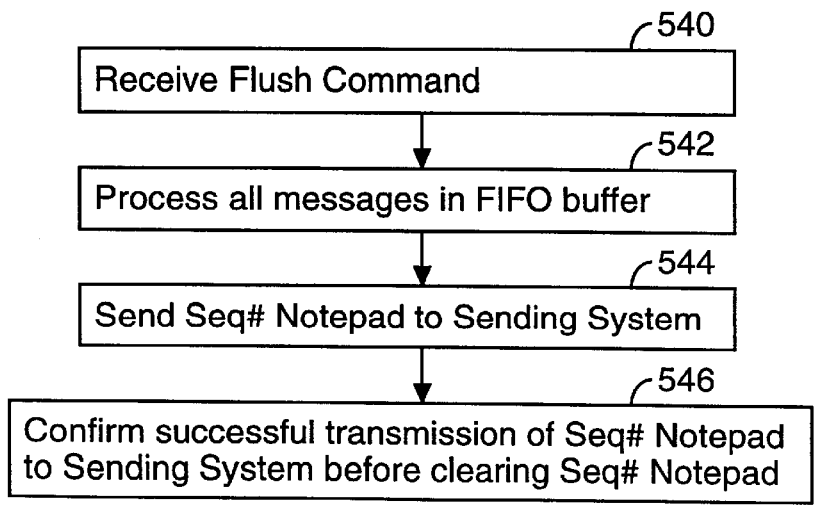
FIG. 14 is a flow chart of a procedure, executed by a message receiving computer, for resynchronizing two computers with respect to the handling of previously transmitted messages.

Referring to FIG. 14, when the receiving system receives the flush command (540) it processes all messages in its receive FIFO (542). Then it sends a copy of the sequence number notepad to the sending system (544). Alternately, if the flush command includes parameters indicating the range of sequence numbers in the messages that the sending system considers to be pending, the receiving system sends a corresponding subset of the sequence number notepad to the sending system.

The receiving system confirms successful transmission of the sequence number notepad to the sending system before clearing the sequence number notepad (546). Alternately, the receiving system does not clear the notepad in response to a flush command. Rather, it waits until it receives a message whose message number meets a predefined wraparound sequence number criteria (472 in FIG. 11), at which time it clears the notepad (477 in FIG. 11).

Check for Error Procedure

A feature of the preferred embodiment of the present invention is that it uses the same mechanisms for detecting and recovering from message transmission failure, regardless of whether the failure occurred while transmitting the message to the receiving system, or while the receiving system was transmitting an acknowledgment message back to the sending system. The two procedures which perform this function in the preferred embodiment are the Check for Error and Check for Timeout procedures.

Figure 15:
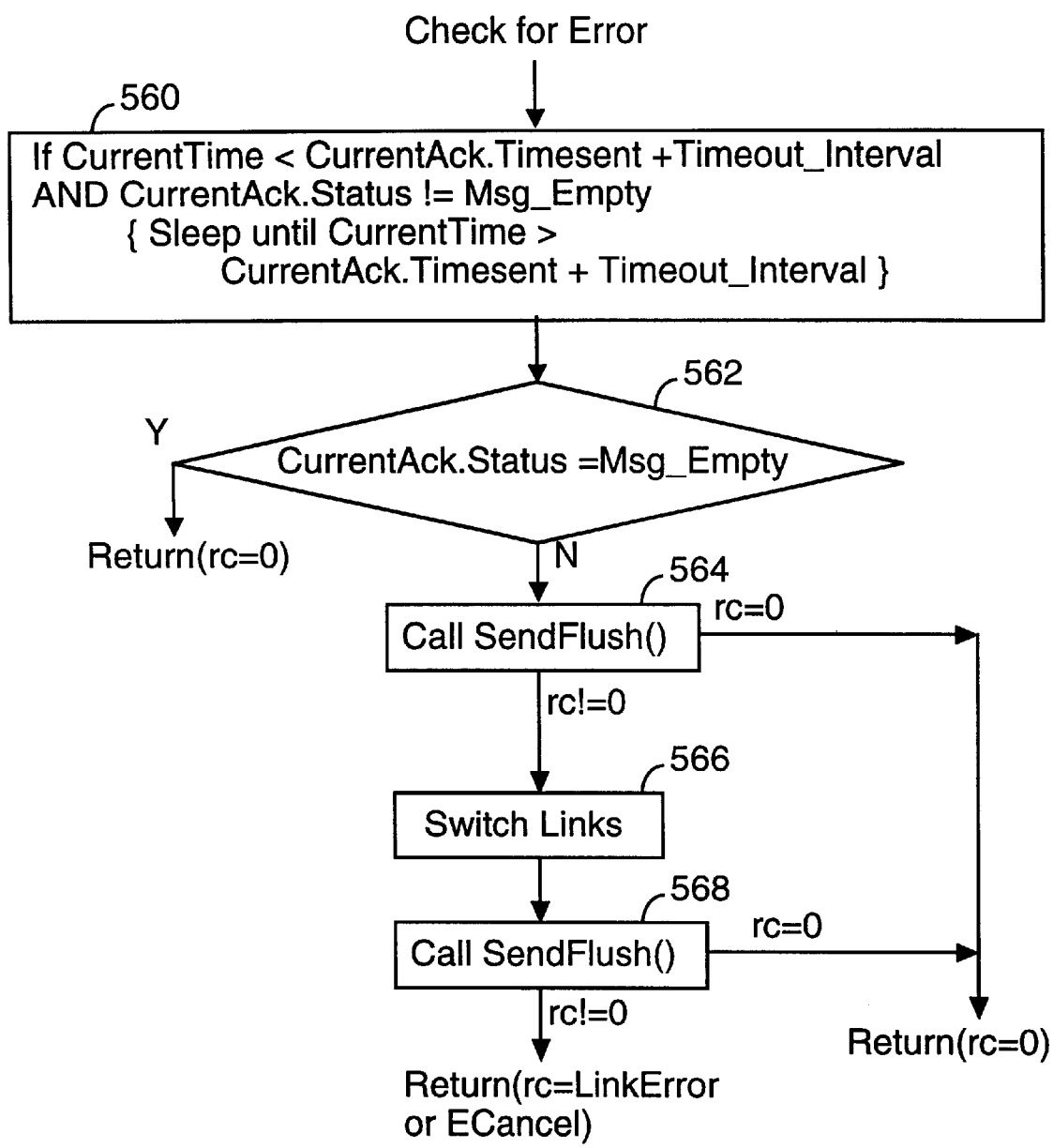
FIG. 15 is a flow chart of a procedure for detecting and correcting message transmission errors in a preferred embodiment of the present invention.

Referring to FIG. 15, the Check for Error procedure is called by the Send_Message procedure at step 414 (see FIG. 10A) when the sending system has not yet received an acknowledgment from the receiving system for the previously sent message whose status information is still stored in the current ack queue entry. The Check for Error procedure first checks to see if the amount of time elapsed since the transmission of the previously sent message is at least a predefined Timeout_Interval and that the message status in the ack queue entry is still not equal to "Msg_Empty" (step 560). If the Timeout_Interval has not yet elapsed, then the sending system has sent a sequence of messages so quickly that it used all the slots in the ack message queue before the Timeout_Interval has elapsed. If both the tested conditions are true, the sending thread is put in a sleep condition until expiration of the Timeout_Interval.

Next, the procedure re-checks the status field of the current Ack queue slot to see if it now stores a "Msg_Empty" value (562). If so, there is no error condition and the procedure exits. Otherwise, the SendFlush procedure is called (564) to flush the receive FIFO in the receiving system, in an attempt to get the receiving system to process all outstanding messages. If SendFlush is successful, indicated by its returning with a zero return code, the error has been fixed and the procedure exits.

The SendFlush procedure returns an error code if it is unable to confirm that the receiving system has received all previously sent messages. In this case the sending computer "switches links" (566), which means that it activates a different communication interface (sometimes called a channel or link) than the one previously activated. After activating a new communications interface, the SendFlush procedure is called a second time (568). If the SendFlush procedure returns this time without error, indicating that all previously sent messages have been received and processed by the receiving system, the procedure exits. Otherwise, the procedure finishes by returning an appropriate error code to the calling (Send_Message) procedure.

Check for Timeout Procedure

Figure 16:
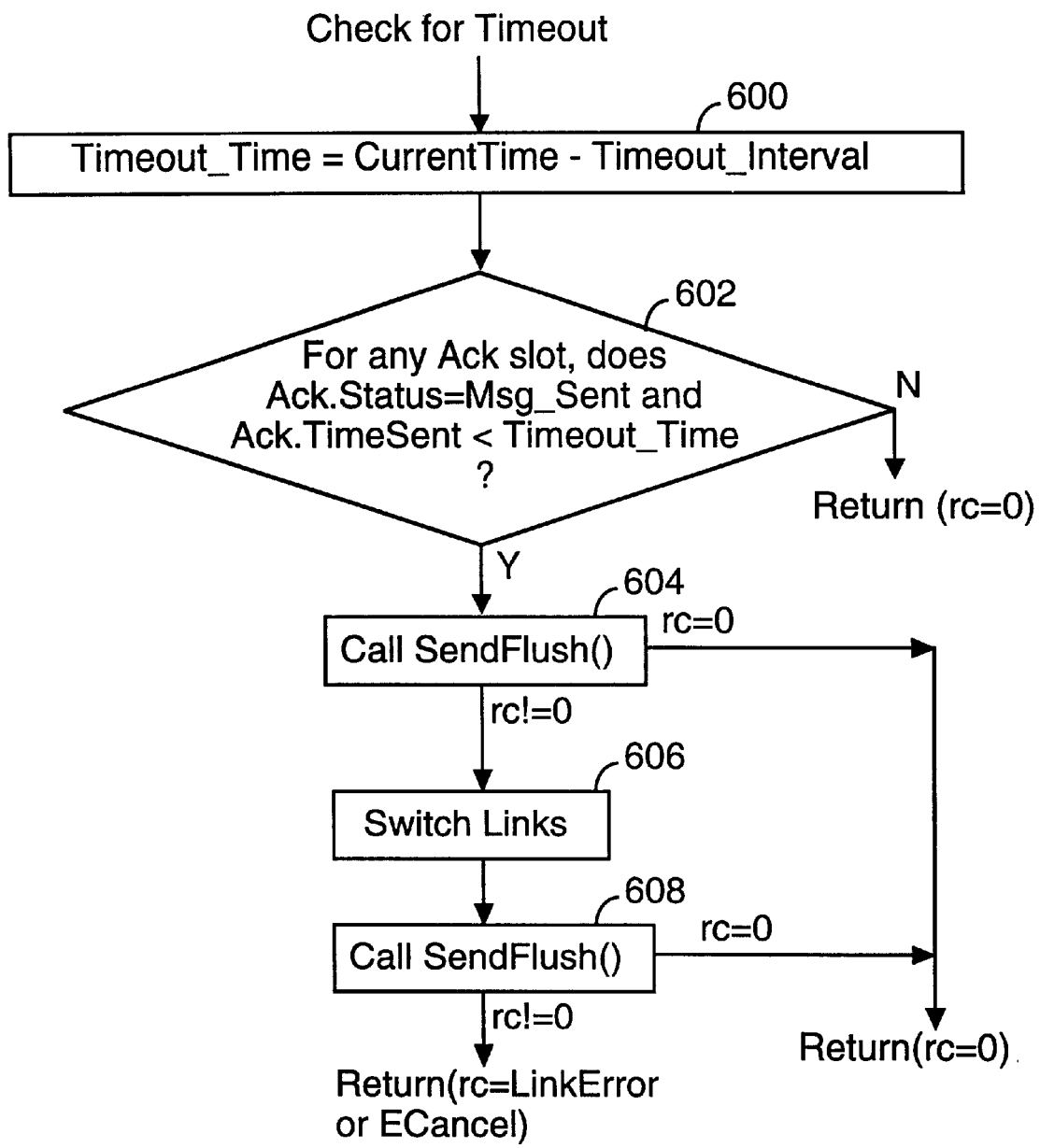
FIG. 16 is a flow chart of an operating system procedure for detecting and correcting message transmission timeout conditions in a preferred embodiment of the present invention.

Referring to FIG. 16, the Check for Timeout procedure is periodically called by a sending side timeout thread. The procedure first determines a Timeout Time, which is the current time minus a predefined timeout interval (step 602). Then, the procedure inspects all the entries (if any) in the ack queue for pending messages (i.e., whose status is equal to Msg_Empty), and determines if any of those entries has a TimeSent that is earlier than the Timeout Time (602). If even one such entry is found, that means that either the receiving computer is not processing messages as quickly as would be expected, or that at least one message was lost either before it could be processed by the receiving computer, in which case a set of remedial actions are performed (604, 606, 608) that are same as steps 564, 566, 568 in the Check for Error procedure (FIG. 15).

Alternate Embodiments

In an alternate embodiment, in which highly reliable links are used, the use of barrier instructions can be eliminated because it can be assumed that virtually all messages are received. The local copy of each sent message (e.g., stored in send buffer 352) is not deleted until an acknowledgment message is received from the receiving system, but the transmission of subsequent messages is not dependent on the receipt of that acknowledgment message.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for sending messages from a first computer to a second computer, comprising the steps of:

at the first computer, activating one of a plurality of communication links;

transmitting, over the activated communication link, messages from the first computer to the second computer using remote write operations to directly store each message in memory in the second computer, without performing remote read operations to confirm storage of each message in memory of the second computer; said remote write operations by the first computer writing the messages to global addresses that have previously been mapped to physical addresses in the second computer's memory;

assigning each message transmitted by the first computer a sequence number, and including the sequence number in the message when it is transmitted to the second computer;

at the second computer, processing each received message, storing sequence number information indicating the sequence number of each message received and processed, and using remote write operations to directly store an acknowledgment message in memory in the first computer, without performing remote read operations to confirm storage of each acknowledgment message; said remote write operations by the second computer writing the acknowledgment messages to global addresses that have previously been mapped to physical addresses in the first computer's memory; and at the first computer, upon detecting a failure to receive the acknowledgment message corresponding to any of the previously sent messages, performing remedial actions to determine whether the second computer has processed the unacknowledged previously sent messages;

the remedial actions including, at the initiative of the first computer, retrieving from the second computer at least some of the sequence number information stored in the second computer and determining, using the sequence number information retrieved from the second computer, which messages, if any, sent by the first computer were not received and processed by the second computer, and re-transmitting to the second computer the messages, if any, determined not to have been received and processed by the second computer.

2. The method of claim 1, the remedial actions including, determining when the activated communication link has failed and activating a different one of the plurality of communication links.

3. The method of claim 1, at the first computer:

establishing a circular ack message queue of entries for denoting messages sent to the second computer, and establishing a pointer to a current entry in the queue; and for each message transmitted to the second computer, storing in a respective entry in the ack message queue a message status value indicating transmission of the respective message; and at the second computer, responding to receipt of each respective message by:
processing each received message, including storing an acknowledgment message in a corresponding ack message queue entry in the first computer.

4. The method of claim 3, wherein, when the remedial actions determine that the second computer has already processed a message for which the first computer did not receive a corresponding ack message, the remedial actions including storing the acknowledgment message in the corresponding ack message queue entry in the first computer.

5. A method for sending messages from a first computer to a second computer, comprising the steps of:

at the first computer, activating one of a plurality of communication links;

transmitting, over the activated communication link, messages from the first computer to the second computer using remote write operations to directly store each message in memory in the second computer, without performing remote read operations to confirm storage of each message in memory of the second computer;

assigning each message transmitted by the first computer a sequence number, and including the sequence number in the message when it is transmitted to the second computer;

at the second computer, processing each received message, storing sequence number information indicating the sequence number of each message received and processed, and storing an acknowledgment message in memory in the first computer; and at the first computer, upon detecting a failure to receive the acknowledgment message corresponding to any of the previously sent messages, performing remedial actions to determine whether the second computer has processed the unacknowledged previously sent messages;

the remedial actions including determining, at the initiative of the first computer, using the sequence number information stored in the second computer, which messages, if any, sent by the first computer were not received and processed by the second computer, and re-transmitting to the second computer the messages, if any, determined not to have been received and processed by the second computer;

the sequence number assigning step including:
determining when assignment of a next sequence number will cause a predefined sequence number wraparound condition;
upon making a wraparound condition determination, sending a message to the second computer to prompt the second computer to process all messages previously sent by the first computer to the second computer and retrieving from the second computer the sequence number information;
determining from the retrieved sequence number information which messages, if any, sent by the first computer were not received and processed by the second computer, and re-transmitting to the second computer the messages, if any, determined not to have been received and processed by the second computer; and
assigning the next sequence number to a next message.

6. The method of claim 5, wherein after making the wraparound condition determination and before sending the prompt message to the second computer, the first computer ensures that all messages previously assigned a sequence number have been transmitted to the second computer or canceled.

7. In a distributed computer system, apparatus for remotely writing messages from a first computer to a second computer, comprising:

at the first computer:
a CPU;
a plurality of network interfaces for transmitting and receiving messages;
a message transmission procedure, for execution by the first computer's CPU, for activating one of the plurality of network interfaces and transmitting messages from the first computer to the second computer, via the activated network interface, using remote write operations to store each message in memory in the second computer, without performing remote read operations to confirm storage of each message in the second computer's memory; said remote write operations by the first computer writing the messages to global addresses that have previously been mapped to physical addresses in the second computer's memory;
a procedure for assigning a sequence number to each message transmitted by the first computer;
the message transmission procedure including instructions for including the sequence number in the message when it is transmitted to the second computer;

at the second computer:
a CPU;
a network interface for transmitting and receiving messages;
a receive message procedure, for execution by the second computer's CPU, for processing each message received from the first computer, for storing sequence number information indicating the sequence number of each message received and processed, and for remotely writing, via the network interface, an acknowledgment message in a corresponding memory location in the first computer, without performing remote read operations to confirm storage of each acknowledgment message in the first computer's memory; wherein said remote writing writes the acknowledgment messages to global addresses that have previously been mapped to physical addresses in the first computer's memory; and at the first computer,
the message transmission procedure including instructions for detecting a failure to receive the acknowledgment message corresponding to any of the previously sent messages, and for performing remedial actions to determine whether the second computer has processed the unacknowledged previously sent message; the remedial actions including, at the initiative of the first computer, retrieving from the second computer at least some of the sequence number information stored in the second computer and determining, using the sequence number information retrieved from the second computer, which messages, if any, sent by the first computer were not received and processed by the second computer, and re-transmitting to the second computer the messages, if any, determined not to have been received and processed by the second computer.

8. The apparatus of claim 7, further including:
at the second computer
a set of receive buffers for receiving messages from the first computer;
a circular received message queue of entries for indicating receipt of respective messages at the first computer;
at the first computer:
a circular ack message queue of entries for denoting messages sent to the second computer, and a pointer to a current entry in the queue and a pointer to a corresponding current entry in the received message queue in the second computer;
the instructions for performing remedial actions including instructions for storing the acknowledgment message in a corresponding ack message queue entry in the first computer when the remedial actions determine that the second computer has already processed the unacknowledged previously sent message.

9. In a distributed computer system, apparatus for remotely writing messages from a first computer to a second computer, comprising:
at the first computer:
a CPU;
a plurality of network interfaces for transmitting and receiving messages;
a message transmission procedure, for execution by the first computer's CPU, for activating one of the plurality of network interfaces and transmitting messages from the first computer to the second computer, via the activated network interface, using remote write operations to store each message in memory in the second computer, without performing remote read operations to confirm storage of each message in the second computer's memory; and
a procedure for assigning a sequence number to each message transmitted by the first computer;
the message transmission procedure including instructions for including the sequence number in the message when it is transmitted to the second computer;
at the second computer:
a CPU;
a network interface for transmitting and receiving messages;
a receive message procedure, for execution by the second computer's CPU, for processing each message received from the first computer, for storing sequence number information indicating the sequence number of each message received and processed, and for remotely writing, via the network interface, an acknowledgment message in a corresponding memory location in the first computer;
a set of receive buffers for receiving messages from the first computer; and
a received message queue of entries for indicating receipt of respective messages at the first computer;
at the first computer,
an ack message queue of entries for denoting messages sent to the second computer, and a pointer to a current entry in the queue and a pointer to a corresponding current entry in the received message queue in the second computer;
the message transmission procedure including instructions for detecting a failure to receive the acknowledgment message corresponding to any of the previously sent messages, and for performing remedial actions to determine whether the second computer has processed the unacknowledged previously sent message; the remedial actions including, at the initiative of the first computer, retrieving from the second computer at least some of the sequence number information stored in the second computer and determining, using the sequence number information retrieved from the second computer, which messages, if any, sent by the first computer were not received and processed by the second computer, and re-transmitting to the second computer the messages, if any, determined not to have been received and processed by the second computer;
the message transmission procedure including instructions for remotely writing into a respective entry in the received message queue in the second computer a message status value indicating transmission of the respective message and a sequence number; and
the receive message procedure including instructions for updating the message status value in the received message queue entry corresponding to a received message to indicate that the received message has been processed; and
the instructions for performing remedial actions including instructions for remotely reading a portion of the received message queue entry in the second computer corresponding to a previously sent message for which an acknowledgment message has not been received, the remotely read portion containing a message status value and sequence number, and determining from the remotely read message status value and sequence number what additional remedial actions to perform.

10. The apparatus of claim 9,
the instructions for performing remedial actions further including instructions for storing the acknowledgment message in the corresponding memory location in the first computer when the remotely read status value and sequence number indicate that the second computer system received and processed the corresponding previously sent message.

11. The apparatus of claim 10,
the instructions for performing remedial actions further including instructions for repeating the writing of the message status value and sequence number to the corresponding received message queue entry in the second computer when the remotely read status value and sequence number indicate that the message status value and sequence number were not successfully written into the corresponding received message queue entry in the second computer.

12. In a distributed computer system, apparatus for remotely writing messages from a first computer to a second computer, comprising:
at the first computer:
a CPU;
a plurality of network interfaces for transmitting and receiving messages;
a message transmission procedure, for execution by the first computer's CPU, for activating one of the plurality of network interfaces and transmitting messages from the first computer to the second computer, via the activated network interface, using remote write operations to store each message in memory in the second computer, without performing remote read operations to confirm storage of each message in the second computer's memory;

a procedure for assigning a sequence number to each message transmitted by the first computer;

the message transmission procedure including instructions for including the sequence number in the message when it is transmitted to the second computer;

at the second computer:

a CPU;

a network interface for transmitting and receiving messages;

a receive message procedure, for execution by the second computer's CPU, for processing each message received from the first computer, for storing sequence number information indicating the sequence number of each message received and processed, and for remotely writing, via the network interface, an acknowledgment message in a corresponding memory location in the first computer;

at the first computer, the message transmission procedure including instructions for detecting a failure to receive the acknowledgment message corresponding to any of the previously sent messages, and for performing remedial actions to determine whether the second computer has processed the unacknowledged previously sent message; the remedial actions including, at the initiative of the first computer, retrieving from the second computer at least some of the sequence number information stored in the second computer and determining, using the sequence number information retrieved from the second computer, which messages, if any, sent by the first computer were not received and processed by the second computer, and re-transmitting to the second computer the messages, if any, determined not to have been received and processed by the second computer;

wherein the sequence number assigning procedure includes instructions for:

determining when assignment of a next sequence number will cause a predefined sequence number wraparound condition;

upon making a wraparound condition determination, sending a message to the second computer to prompt the second computer to process all messages previously sent by the first computer to the second computer and retrieving from the second computer the sequence number information;

determining from the retrieved sequence number information which messages, if any, sent by the first computer were not received and processed by the second computer, and re-transmitting to the second computer the messages, if any, determined not to have been received and processed by the second computer; and assigning the next sequence number to a next message.

13. In a distributed computer system in which a first computer remotely writes messages to a second computer, the first computer comprising:

at least one network interface for transmitting and receiving messages;

a CPU for executing a plurality of procedures, the procedures including:

a message transmission procedure that transmits messages from the first computer to the second computer, via the activated network interface, using remote write operations to store each message in memory in the second computer, without performing remote read operations to confirm storage of each message in the second computer's memory; and a sequence number assigning procedure that assigns a sequence number to each message transmitted by the first computer;

the message transmission procedure including instructions for including the sequence number in the message when it is transmitted to the second computer;

the sequence number assigning procedure including instructions for:

determining when assignment of a next sequence number will cause a predefined sequence number wraparound condition;

upon making a wraparound condition determination, sending a message to the second computer to prompt the second computer to process all messages previously sent by the first computer to the second computer and retrieving from the second computer sequence number information indicating the sequence numbers of messages received and processed by the second computer;

determining from the retrieved sequence number information which messages, if any, sent by the first computer were not received and processed by the second computer, and re-transmitting to the second computer the messages, if any, determined not to have been received and processed by the second computer; and assigning the next sequence number to a next message.

14. The computer of claim 13, wherein the message transmission procedure includes instructions for detecting a failure to receive the acknowledgment message corresponding to any of the previously sent messages, and for performing remedial actions to determine whether the second computer has processed the unacknowledged previously sent message; the remedial actions including determining, at the initiative of the first computer, using the sequence number information stored in the second computer, which messages, if any, sent by the first computer were not received and processed by the second computer, and re-transmitting to the second computer the messages, if any, determined not to have been received and processed by the second computer.

15. A method for sending messages from a first computer to a second computer, the method performed by the first comprising the steps of:

transmitting messages to the second computer using remote write operations to directly store each message in memory in the second computer, without performing remote read operations to confirm storage of each message in memory of the second computer;

assigning each message a sequence number, and including the sequence number in the message when it is transmitted to the second computer;

determining when assignment of a next sequence number will cause a predefined sequence number wraparound condition;

upon making a wraparound condition determination, sending a message to the second computer to prompt the second computer to process all messages previously sent by the first computer to the second computer and retrieving from the second computer sequence number information indicating the sequence numbers of messages received and processed by the second computer;

determining from the retrieved sequence number information which messages, if any, sent by the first computer were not received and processed by the second computer, and re-transmitting to the second computer the messages, if any, determined not to have been received and processed by the second computer; and assigning the next sequence number to a next message.

16. The method of claim 15, further including:

receiving from the second computer acknowledgment messages, each acknowledgment message corresponding to one of the messages transmitted by the first computer;

upon detecting a failure to receive the acknowledgment message corresponding to any of the previously sent messages, performing remedial actions to determine whether the second computer has processed the unacknowledged previously sent messages;

the remedial actions including determining, at the initiative of the first computer, using the sequence number information stored in the second computer, which messages, if any, sent by the first computer were not received and processed by the second computer, and re-transmitting to the second computer the messages, if any, determined not to have been received and processed by the second computer.

* * * * *